United States Patent
Ganu et al.

(10) Patent No.: US 12,101,685 B2
(45) Date of Patent: Sep. 24, 2024

(54) COORDINATED RANGING BETWEEN ACCESS POINTS IN A NETWORK

(71) Applicant: HEWLETT PACKARD ENTERPRISE DEVELOPMENT LP, Houston, TX (US)

(72) Inventors: Sachin Ganu, San Jose, CA (US); Omar El Ferkouss, St. Laurent (CA); Vikram Raghu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 370 days.

(21) Appl. No.: 17/541,909

(22) Filed: Dec. 3, 2021

(65) Prior Publication Data

US 2023/0179950 A1  Jun. 8, 2023

(51) Int. Cl.
*H04W 4/02* (2018.01)
*H04B 17/309* (2015.01)
*H04W 8/00* (2009.01)
*H04W 64/00* (2009.01)

(52) U.S. Cl.
CPC .......... *H04W 4/023* (2013.01); *H04B 17/309* (2015.01); *H04W 8/005* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 9,220,081 B2 | 12/2015 | Prechner et al. | |
| 9,949,156 B2 | 4/2018 | Patil et al. | |
| 10,034,188 B2 | 7/2018 | Ben-Haim et al. | |
| 10,187,817 B2 | 1/2019 | Sanderovich et al. | |
| 10,375,623 B2 | 8/2019 | Bajko et al. | |
| 10,477,349 B2 | 8/2019 | Sinha et al. | |
| 11,283,420 B1 | 3/2022 | Silverman et al. | |
| 2006/0099950 A1 | 5/2006 | Klein et al. | |
| 2007/0140163 A1 | 6/2007 | Meier et al. | |
| 2010/0330957 A1 | 12/2010 | Harada et al. | |
| 2017/0135019 A1 | 5/2017 | Vamaraju et al. | |
| 2018/0227714 A1 | 8/2018 | Lee et al. | |
| 2018/0249437 A1 | 8/2018 | Lindskog et al. | |
| 2019/0271774 A1 | 9/2019 | Zhang et al. | |
| 2019/0306825 A1 | 10/2019 | Lindskog et al. | |
| 2020/0389343 A1* | 12/2020 | Zhang | H04L 5/0044 |
| 2021/0051624 A1* | 2/2021 | Koshy | H04W 24/10 |
| 2022/0338141 A1 | 10/2022 | Singh et al. | |

* cited by examiner

*Primary Examiner* — Frantz Bataille
(74) *Attorney, Agent, or Firm* — Hewlett Packard Enterprise Patent Department

(57) ABSTRACT

Examples described herein provide coordinated ranging between APs in a network. Examples described herein may receive, by a computing device, neighbor adjacency information for a plurality of access points (APs) in a network, and based on the neighbor adjacency information, assign, by the computing device, subsets of the plurality of APs to non-overlapping zones. Examples described herein may initiate, by the computing device for each of the non-overlapping zones, ranging measurements between the subset of APs in the zone to generate a ranging result, wherein the ranging measurements between the subsets of APs in the non-overlapping zones are performed in parallel. Examples described herein may, based on the ranging results, resolve, by the computing device, locations of the plurality of APs.

20 Claims, 10 Drawing Sheets

COORDINATED RANGING BETWEEN ACCESS POINTS IN A NETWORK

CROSS-REFERENCE TO RELATED APPLICATIONS

This application is related to co-pending and co-owned U.S. patent application Ser. No. 17/541,872, filed on Dec. 3, 2021 titled "RANGING BY A NETWORK DEVICE DURING A BEACON INTERVAL," which is incorporated herein by reference in its entirety.

BACKGROUND

Generally, in a Wireless Local Area Network (WLAN), one or more Access Points (APs) may be deployed. Communication devices such as laptops, personal computers, smartphones, etc. may connect to the WLAN to exchange data within the network. The communication devices can raise ranging requests with the one or more APs.

Ranging techniques such as the Fine Timing Measurement (FTM) protocol have attained prominence due to wide compatibility between the APs and the communication devices. The FTM protocol, typically, comprises exchange of messages between the APs and the communication devices. From the messages, a time of flight, a round trip time, etc. is derived, which is used for determining a position of the communication device with reference to the AP. For example, the time of flight can be defined as the overall time taken by signals to propagate from the AP to a client device (say, the communication device), and back to the AP from the client device. From the time of flight information, a distance between the AP and the client device may be determined.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Figure 1:
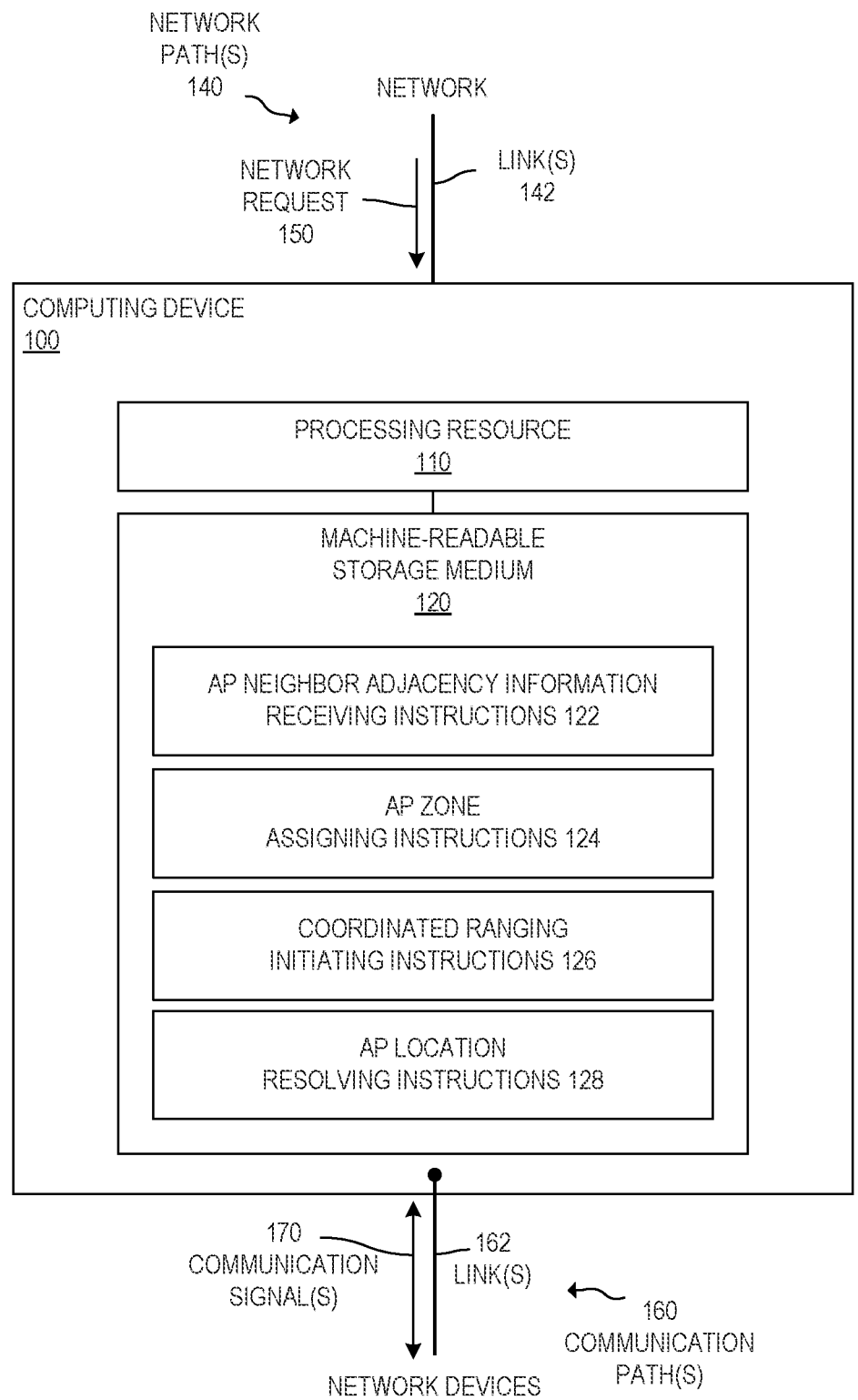
FIG. 1 is a block diagram of an example computing device for providing coordinated ranging between APs in a network.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Recently, there have been efforts to automatically locate APs in a network, for instance, on a visual floor plan of the network. Such automatic location of APs is advantageous over the manual location of APs, as the manual location of APs can be an error-prone process. For instance, when manually locating APs in a network, an AP's location may be incorrectly measured or entered, or an AP may be moved or removed from service.

To support the automatic location of APs, the APs need to perform packet exchanges with neighboring APs, and then measure the round trip time (RTT) of these packet exchanges to estimate the range of the APs to their corresponding neighbor APs. Performing ranging sequentially between individual pairs of APs may result in increased airtime overhead since a large amount of available airtime is used to complete the ranging measurements between the APs. Thus, there is a need for efficient ranging between APs in a network which minimizes airtime overhead.

To address these issues, examples described herein provide coordinated ranging between APs in a network. Examples described herein may receive, by a computing device, neighbor adjacency information for a plurality of access points (APs) in a network, and based on the neighbor adjacency information, assign, by the computing device, subsets of the plurality of APs to non-overlapping zones. Examples described herein may initiate, by the computing device for each of the non-overlapping zones, ranging measurements between the subset of APs in the zone to generate a ranging result, wherein the ranging measurements between the subsets of APs in the non-overlapping zones are performed in parallel. Examples described herein may receive, by the computing device, the ranging results, based on the ranging results, resolve, by the computing device, locations of the plurality of APs.

In this manner, examples described herein provide coordinated ranging between APs in a network, which reduces airtime overhead for performing ranging. For instance, examples described herein may, based on received neighbor adjacency information from a plurality of APs, assign, by a computing device, subsets of the plurality of APs to non-overlapping zones, thereby assigning proximate (neighboring) APs to non-overlapping zones to initiate efficient, coordinated ranging between the APs. Moreover, examples described herein may initiate, by the computing device for each of the non-overlapping zones, ranging measurements between the subset of APs in the zone to generate a ranging result, wherein the ranging measurements between the subsets of APs in the non-overlapping zones are performed in parallel, thereby reducing airtime overhead by decreasing the airtime for completing the ranging measurements between the APs.

Computing Device

Referring now to the drawings, FIG. 1 depicts a block diagram of an example computing device 100 for coordinated ranging between APs in a network. Computing device 100 includes at least one processing resource 110 and at least one machine-readable storage medium 120 comprising (e.g., encoded with) at least AP neighbor adjacency information receiving instructions 122, AP zone assigning instructions 124, coordinated ranging initiating instructions 126, and AP location resolving instructions 128.

In the example of FIG. 1, computing device 100 may include a device to communicate with a plurality of APs in a network to provide coordinated ranging between the APs. For instance, computing device 100 may comprise a gateway router, a wireless local area network (WLAN) controller, a switch, a server, or a combination thereof. In some examples, computing device 100 may comprise an AP that is configured to communicate with the plurality of APs in the network.

In the example of FIG. 1, computing device 100 may engage in any network data transmission operations, including, but not limited to, switching, routing, bridging, or a combination thereof. Moreover, computing device 100 may gather network operating information from various nodes of one or more networks, including network traffic load information, network topology information, network usage information, etc. Furthermore, computing device 100 may transmit commands to various nodes of the one or more networks to alter network topology and routing to achieve various network efficiency and efficacy goals. It will be understood that computing device 100 may comprise any suitable type(s) of computing device(s) configured to perform coordinated ranging between APs in a network. Moreover, computing device 100 may include any necessary hardware components to perform the inventions disclosed herein, including, but not limited to: processors, memories, display devices, input devices, communications equipment, etc.

In the example of FIG. 1, computing device 100 may be configured (e.g., encoded with instructions executable by at least one processing resource 110) to receive network request(s) 150 from a network via network path(s) 140. Network path(s) 140 may include any suitable link(s) 142 (e.g., wired or wireless, direct or indirect, etc.) between computing device 100 and a network. Network request(s) 150 may include any suitable instructions to instruct compute device 100 to perform coordinated ranging between APs in a network. For instance, network request(s) 150 may include instructions to instruct computing device 100 to perform AP neighbor adjacency information receiving instructions 122, AP zone assigning instructions 124, coordinated ranging initiating instructions 126, and AP location resolving instructions 128.

In examples described herein, a "network path" may include a combination of hardware (e.g., interfaces, links, etc.) and instructions (e.g., executable by a processing resource) to communicate (e.g., receive, send) a command (e.g., network request 150) to an external resource (e.g., server, cloud computing resource, etc.) connected to the network.

In the example of FIG. 1, computing device 100 may be configured (e.g., encoded with instructions executable by at least one processing resource 110) to send or receive communication signal(s) 170 via communication path(s) 160 to perform coordinated ranging between APs in a network. Communication path(s) 160 may include any suitable link(s) 162 (e.g., wired or wireless, direct or indirect, etc.) between computing device 100 and one or more network devices. Communication signal(s) 170 may include any suitable instructions for computing device 100 to perform coordinated ranging between APs in a network (e.g., to perform AP neighbor adjacency information receiving instructions 122, AP zone assigning instructions 124, coordinated ranging initiating instructions 126, and AP location resolving instructions 128).

In examples described herein, a "communication path" may include a combination of hardware (e.g., interfaces, links, etc.) and instructions (e.g., executable by a processing resource) to communicate (e.g., receive, send) a command with one or more network devices.

Coordinated Ranging Between APs

Figure 3:
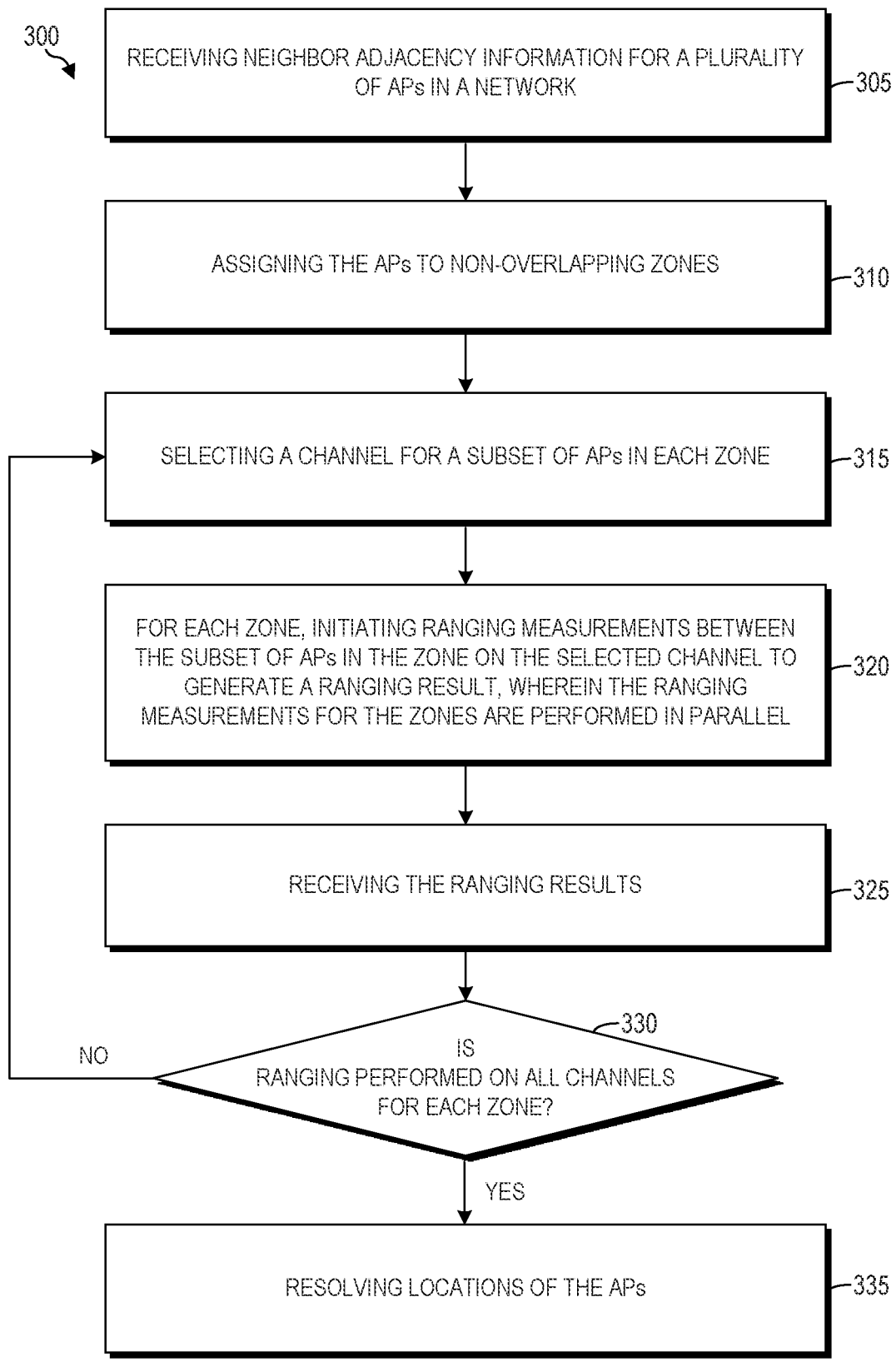
FIG. 3 is a flowchart of an example method for providing coordinated ranging between APs in a network.

Referring to FIG. 3, a flowchart depicting a method 300 for coordinated ranging between APs in a network is presented in some examples. Although the execution of method 300 is described below with reference to computing device 100 of FIG. 1, any suitable computing device for the execution of method 300 may be utilized. Additionally, the implementation of method 300 is not limited to such examples. While method blocks 305 to 335 are shown in method 300, method 300 may include other actions described herein. Additionally, although the blocks are shown in an order, blocks depicted in FIG. 3 may be performed in any suitable order and at any time. Moreover, one or more of blocks of method 300 may be performed in combination with one or more blocks of methods 400, 500, 600, 700, 800, 900, or 1000. Also, some of the blocks shown in method 300 may be omitted without departing from the spirit and scope of this disclosure.

At block 305, method 300 may include receiving neighbor adjacency information for a plurality of APs in a network. Referring to computing device 100 of FIG. 1, AP neighbor adjacency information receiving instructions 122, when executed by processing resource 110, may receive neighbor adjacency information for the plurality of APs in the network.

The neighbor adjacency information may include label information for one or more APs of the plurality of APs. The label information for an AP may include a floor label which indicates a floor (e.g., of a building) on which the AP is located. Based on the label information for one or more APs, method 300 may include determining that one or more of the plurality of APs are co-planar with each other. For instance, when the floor label of two APs are the same, computing device 100 may determine (based on the floor labels) that such two APs are on the same floor as each other (and thus co-planar with each other.) It will be understood that the label information for an AP received by computing device 100 may have any suitable format. For instance, the label information for an AP may be indicated by (e.g., included in) one or more data packets which are received by computing device 100.

In addition, the neighbor adjacency information for the plurality of APs may be based on a radio frequency (RF) discovery process performed by one or more of the plurality of APs. Specifically, the neighbor adjacency information for the plurality of APs may comprise a neighbor adjacency matrix, wherein each element of the neighbor adjacency matrix indicates an adjacency between two APs of the plurality of APs. For instance, an element of the adjacency matrix has a value of "1" to indicate that two APs of the plurality of APs are adjacent to each other, and an element of the adjacency matrix has a value of "0" to indicate that two APs of the plurality of APs are not adjacent to each other. Computing device 100 may determine that two APs of the plurality of APs are adjacent to each other when a radio frequency (RF) signal between the two APs satisfies (e.g., exceeds) a RF signal strength threshold. Based on the neighbor adjacency matrix for two or more of the plurality of APs, method 300 may include determining whether the two or more of the plurality of APs are in a same RF neighborhood each other (e.g., on the same floor and/or co-planar with each other, proximate to each other, etc.). Computing device 100 may determine whether an element of the neighbor adjacency matrix (corresponding to two APs of the plurality of APs) satisfies an adjacency threshold (e.g., whether the element has a value of "1"). Based on (e.g., in response to) determining that the element satisfies the adjacency threshold, computing device 100 may determine that the two corresponding APs are in the same RF neighborhood (e.g., are located on the same floor and thus co-planar with each other, are proximate to each other, or a combination thereof.) Conversely, based on determining that the element does not satisfy the adjacency threshold, computing device 100 may determine that the two corresponding APs are not in the same RF neighborhood (e.g., are not located on the same floor and are thus not co-planar with each other, are not proximate to each other, or a combination thereof.) It will be understood that the neighbor adjacency matrix for the plurality of APs received by computing device 100 may have any suitable format. For instance, the neighbor adjacency matrix for the plurality of APs may be indicated by (e.g., included in) one or more data packets (e.g., management packets) which are received by computing device 100.

At block 310, based on (e.g., in response to) the received neighbor adjacency information, method 300 may include assigning the plurality of APs to non-overlapping zones. Referring to computing device 100 of FIG. 1, based on the received neighbor adjacency information, AP zone assigning instructions 124, when executed by processing resource 110, may assign the plurality of APs to non-overlapping zones.

Assigning the plurality of APs to the non-overlapping zones may be based on a received signal strength indicator (RSSI) of the plurality of APs, wherein the neighbor adjacency information includes the RSSI between pairs of APs of the plurality of APs. Each non-overlapping zone may correspond to a physical area, wherein one or more APs may be located in each non-overlapping zone. In some examples, two or more non-overlapping zones may be directly adjacent to each other, such that there is no space between the two or more non-overlapping zones. In some examples, two or more non-overlapping zones may be proximate (but not directly adjacent) to each other, such that there is a space between the two or more non-overlapping zones. Each non-overlapping zone may have any suitable shape, for example, a regular shape such as a rectangle, circle, etc., or an irregular shape. Each non-overlapping zone may correspond to one or more partitions (e.g., rooms) of a building.

Assigning the plurality of APs to the non-overlapping zones may comprise assigning subsets of the plurality of APs to non-overlapping zones. For instance, computing device 100 may assign a first subset of the plurality of APs to a first zone of the non-overlapping zones and a second subset of the plurality of APs to a second zone of the non-overlapping zones. It will be understood that computing device 100 may assign subsets of the plurality of APs to two, three, ten, or any suitable number of non-overlapping zones.

At block 315, method 300 may include, for each of the non-overlapping zones, selecting a channel for a subset of APs in the zone. Referring to computing device 100 of FIG. 1, AP zone assigning instructions 124, when executed by processing resource 110, may, for each of the non-overlapping zones, select a channel for a subset of APs in the zone.

In some examples, selecting a channel for the subset of APs in each of the non-overlapping zones may comprise selecting, by computing device 100, a different channel for two or more of the non-overlapping zones. For instance, computing device 100 may select a first channel for a first subset of APs in a first zone and select a second channel for a second subset of APs in a second zone, wherein each AP in the first zone is configured to use the first channel for ranging measurements with one or more other APs in the first zone, and each AP in the second zone is configured to use the second channel for ranging measurements with one or more other APs in the second zone. By assigning a different channel to each subset of APs in two or more non-overlapping zones, computing device 100 may minimize interference between ranging measurements performed in the different zones. It will be understood that each channel (e.g., first channel, second channel) selected for each of the non-overlapping zones may correspond to any suitable frequency band(s) in accordance with any suitable standard(s), e.g., the Institute of Electrical and Electronic Engineers (IEEE) 802.11 standards.

In some examples, selecting a channel for the subset of APs in each of the non-overlapping zones may comprise, selecting, by computing device 100, a same channel for two or more of the non-overlapping zones when a distance between the two or more non-overlapping zones is greater than a minimum threshold distance. The minimum threshold distance may correspond to a distance between two zones in which there is no interference (or substantially no interference) between ranging measurements by APs in each of the two zones on the same channel. The minimum threshold distance may be computed by computing device 100 or predetermined by a device (e.g., computing device 100) or user. Further, the minimum threshold distance may correspond to an acoustic particle discharge (PD) threshold between two or more APs. For instance, computing device 100 may select a first channel for a first subset of APs in a first zone and select the first channel for a second subset of APs in a second zone, wherein a distance between a first zone and the third zone is greater than or equal to a minimum threshold distance. By assigning a same channel to each subset of APs in two or more non-overlapping zones only when a distance between the zones is greater than a minimum threshold distance, computing device 100 may minimize interference between ranging measurements performed in the different zones.

Selecting a channel for a subset of APs in a zone may include, selecting, by computing device 100, a channel (among a plurality of available channels for the subset of APs in a zone) for which ranging has not yet been performed That is, at block 315, the selected channel for the subset of APs in the zone may be a channel for which computing device 100 has not yet initiated ranging measurements between the subset of APs to generate a ranging result (as described below in relation to block 320.)

In some examples, computing device 100 may randomly select a channel among a plurality of available channels for the subset of APs in each of the non-overlapping zones. In other examples, computing device 100 may select a channel among the plurality of available channels for each of the subset of APs based on a predetermined order for selecting the plurality of channels. Such order may be predetermined by a device (e.g., computing device 100) or a user.

At block 320, method 300 may include, for each of the non-overlapping zones, initiating ranging measurements between the subset of APs in the zone to generate a ranging result, wherein the ranging measurements for the non-overlapping zones are performed in parallel. Referring to computing device 100 of FIG. 1, coordinated ranging initiating instructions 126, when executed by processing resource 110, for each of the non-overlapping zones, initiate ranging measurements between the subset of APs in the zone to generate a ranging result, wherein the ranging measurements for the subsets of APs in the non-overlapping zones are performed in parallel.

Ranging measurements between subsets of APs in two non-overlapping zones may be performed in parallel when at least a portion of the ranging measurements between subsets of APs in the two zones are performed simultaneously. For instance, at block 320, method 300 may include initiating, by computing device 100, first ranging measurements between a first subset of APs in a first zone to generate a first ranging result, and initiating, by computing device 100, second ranging measurements between a second subset of APs in a second zone to generate a second ranging result, wherein the first ranging measurements and the second ranging measurements are performed in parallel.

Initiating ranging measurements between a subset of APs (e.g., first subset of APs, second subset of APs) on a selected channel (e.g., first channel, second channel) for the subset of APs may comprise configuring, by computing device 100, the subset of APs to use a channel bandwidth on the selected channel to perform the ranging measurements. For instance, computing device 100 may configure a first subset of APs in a first zone to use a channel bandwidth of 80 MHz in a selected first channel to perform the ranging measurements. It will be understood that computing device 100 may configure a subset of APs in a zone to use a channel bandwidth of 20 MHz, 40 MHz, 80 MHz, 160 MHz, or any suitable channel bandwidth on a selected channel, to perform ranging measurements. In addition, initiating ranging measurements between a subset of APs may comprise configuring, by computing device 100, the subset of APs to use an antenna chain to perform ranging measurements. Configuring a subset of APs to use an antenna chain to perform the ranging measurements may comprise selecting, by computing device 100 for each AP of the subset of APs, an antenna of the AP (among one or more antennas of the AP) to perform the ranging measurements. Moreover, initiating the ranging measurements for a subset of APs may comprise configuring, by computing device 100, one or more of the subsets of APs to use a transmission effective isotropic radiated power (EIRP) to perform the ranging measurements. For instance, computing device 100 may configure an AP of the first subset of APs in a first zone to use a transmission EIRP of 100% of the available power (i.e., Pmax) for the AP to perform the ranging measurements. It will be understood that computing device 100 may configure each AP of a subset of APs to use a transmission EIRP of 100% (Pmax), 90%, 75%, or any other suitable percentage of available power for the AP to perform the ranging measurement.

Each of the ranging measurements (e.g., first ranging measurements, second ranging measurements) between a subset of APs may include a FTM, a RTT measurement, a time of arrival (ToA) measurement, a Time of Flight (ToF) measurement, an Angle of Arrival (AoA) measurement, an RSSI measurement, a short guard interval (SGI) measurement, a long guard interval (LGI) measurement, channel state information (CSI), or a combination thereof, between one or more pairs of APs in the subset of APs. It will be understood that the ranging measurements between the subset of APs may have any suitable format. In addition, the ranging measurements between subset of APs may be performed sequentially. For example, the ranging measurements may be performed between a first pair of APs of a subset of APs, and then performed between a second pair of APs of the subset of APs. Each ranging result may indicate the ranging measurements between one or more pairs of APs in a subset of APs. It will be understood that each ranging result may have any suitable format. For instance, the ranging result for a subset of APs may be indicated by (e.g., included in) one or more data packets which are transmitted by one or more APs of the subset of APs.

At block 325, method 300 may include receiving, by computing device 100, the ranging results from the subsets of APs (in the non-overlapping zones). Referring to computing device 100 of FIG. 1, computing device 100 may comprise instructions to receive ranging results from the subsets of APs. It will be understood that the ranging results received by computing device 100 may have any suitable format. For instance, the ranging result for a subset of APs may be indicated by (e.g., included in) one or more data packets which are received by computing device 100.

At block 330, method 300 may include determining whether ranging is performed on all available channels for each subset of APs in each of the non-overlapping zones. At block 330, if it is determined that ranging has not been performed for all available channels for the subset of APs in each of the non-overlapping zones, then method 300 returns to block 315 to select another channel, for each subset of APs in each of the non-overlapping zones, on which ranging has not yet been performed between the subset of APs. Conversely, at block 330, if it is determined that ranging has been performed for all available channels for the subset of APs in each of the non-overlapping zones, then method 300 proceeds to block 335.

For instance, computing device 100 may determine whether ranging is performed on a third channel for a first subset of APs in a first zone. Based on a determination that ranging is not performed on the third channel for the first subset of APs in the first zone, computing device 100 may select the third channel for the first subset of APs in the first zone (at block 315), then initiate third ranging measurements between the first subset of APs on the third channel to generate a third ranging result, wherein the third ranging measurements are performed in parallel with other ranging measurements (e.g., fourth ranging measurements) for a subset of APs in a different zone (e.g., for the second subset of APs in the second zone) (at block 320). Moreover, in such example, computing device 100 may receive the third ranging result (at block 325), and based on a determination that ranging is performed for all available channels for each subset of APs in each non-overlapping zone (at block 330), resolve locations of the plurality of APs in the network based on at least the first ranging result, the second ranging result, and the third ranging result (as described below in relation to block 335.)

At block 335, method 300 may include, based on (e.g., in response to) the ranging results, resolving locations of the plurality of APs. Referring to computing device 100 of FIG. 1, AP location resolving instructions 128 may comprise instructions to, based on (e.g., in response to) receiving the ranging results, resolve locations of the plurality of APs.

For instance, at block 335, method 300 may include, based on (e.g., in response to) receiving the first ranging result and the second ranging result, resolving the locations of the plurality of APs. Moreover, in the example described above, in which computing device 100 determines that ranging is not performed on the third channel for the first subset of APs in the first zone and initiates third ranging measurements between the first subset of APs on the third channel to generate a third ranging result, computing device

100 may resolve locations of the plurality of APs in the network based on at least the first ranging result, the second ranging result, and the third ranging result.

Resolving the locations of the plurality of APs may include estimating the locations (e.g., coordinates) of the APs on an AP map (e.g., a map of relative AP locations on a visual floor plan) based on the ranging results. Techniques for resolving the locations of the APs based on ranging results (e.g., FTMs) are described further in the following patent applications, which are hereby incorporated by reference.

U.S. application Ser. No. 16/831,213, filed Mar. 26, 2020, in the name of the inventors Vikram Raghu, Eldad Perahia, Sachin Ganu, Sai Pradeep Venkatraman, and Chuck Lukaszewski, and entitled "AUTOMATIC LOCATION OF ACCESS POINTS IN A NETWORK", which is commonly assigned herein.

U.S. application Ser. No. 17/218,309, filed Mar. 31, 2021, in the name of the inventors Amogh Guruprasad Deshmukh, Eldad Perahia, Gaurav Patwardhan, and Sachin Ganu, and entitled "HANDLING FINE TIMING MEASUREMENT REQUESTS", which is commonly assigned herein.

U.S. application Ser. No. 17/229,954, filed Apr. 14, 2021, in the name of the inventors Omar El Ferkouss, Andre Beaudin, and Sachin Ganu, and entitled "FINE TIMING MEASUREMENTS IN ENTERPRISE DEPLOYMENTS USING HIGH BANDWIDTH CHANNELS", which is commonly assigned herein.

U.S. application Ser. No. 17/337,679, filed Jun. 3, 2021, in the name of the inventors Sachin Ganu, Chuck Lukaszewski, Gaurav Patwardhan, Eldad Perahia, Vikram Raghu, and Stuart Wal Strickland, and entitled "AUTOMATIC LOCATION OF ACCESS POINTS IN A NETWORK", which is commonly assigned herein.

In the event of conflict between the incorporated applications and the present disclosure, the present specification, including definitions, controls.

In this manner, example computing device 100 provides coordinated ranging between APs in a network. For instance, computing device 100 may, based on received neighbor adjacency information from a plurality of APs, assign the plurality of APs to non-overlapping zones, wherein a first subset of the plurality of APs is assigned to a first zone of the non-overlapping zones and a second subset of the plurality of APs is assigned to a second zone of the non-overlapping zones, thereby assigning proximate (neighboring) APs to non-overlapping zones to initiate efficient coordinated ranging between the APs. Moreover, computing device 100 may initiate first ranging measurements between a first subset of APs on a first channel to generate a first ranging result, and initiate second ranging measurements between a second subset of APs on a second channel to generate a second ranging result, wherein the first ranging measurements and the second ranging measurements are performed in parallel, thereby reducing airtime overhead by decreasing the airtime for completing the ranging measurements between the APs. Moreover, by assigning a different channel (e.g., first channel, second channel) to each of the non-overlapping zones (e.g., first zone, second zone), computing device 100 may minimize interference between communications by APs in different zones when coordinated ranging measurements are performed by APs in the different zones.

In some examples, method 300 may include determining, by computing device 100 for each of the non-overlapping zones, whether ranging is performed on all available channels (e.g., first channel, second channel, third channel) for the subset of APs in the zone. Based on (e.g., in response to) determining that ranging is not performed on all available channels, method 300 may include selecting, by computing device 100, another channel for the zone (for which ranging has not yet been performed), and initiating ranging measurements between the subset of APs in the zone on the other channel to generate an additional ranging result. Moreover, at block 325, method 300 may include receiving the additional ranging result, wherein resolving the locations of the plurality of APs is based on the additional ranging result.

For example, computing device 100 may initiate first ranging measurements between a first subset of APs on a first channel to generate a first ranging result, and initiate second ranging measurements between a second subset of APs on a second channel to generate a second ranging result. In such example, method 300 may further include determining, by computing device 100, whether ranging is performed for a first subset of APs on a third channel (at block 330). Based on a determination that ranging is not performed for the first subset of APs on the third channel, method 300 may include selecting, by computing device 100, the third channel for the first zone (when method 300 returns to block 315.) Moreover, in such example, method 300 may include initiating, by computing device 100, third ranging measurements between the first subset of APs on the third channel to generate a third ranging result, and receiving, by computing device 100, the third ranging result (at block 325), wherein resolving the locations of the plurality of APs (e.g., at block 330) is based on the third ranging result.

In this manner, example computing device 100 of FIG. 1 (and method 300 of FIG. 3) may ensure that ranging measurements are performed for APs in each of the non-overlapping zones for all available channels to the APs, thereby improving the reliability (e.g., accuracy) of ranging measurements performed by the APs.

Figure 4:
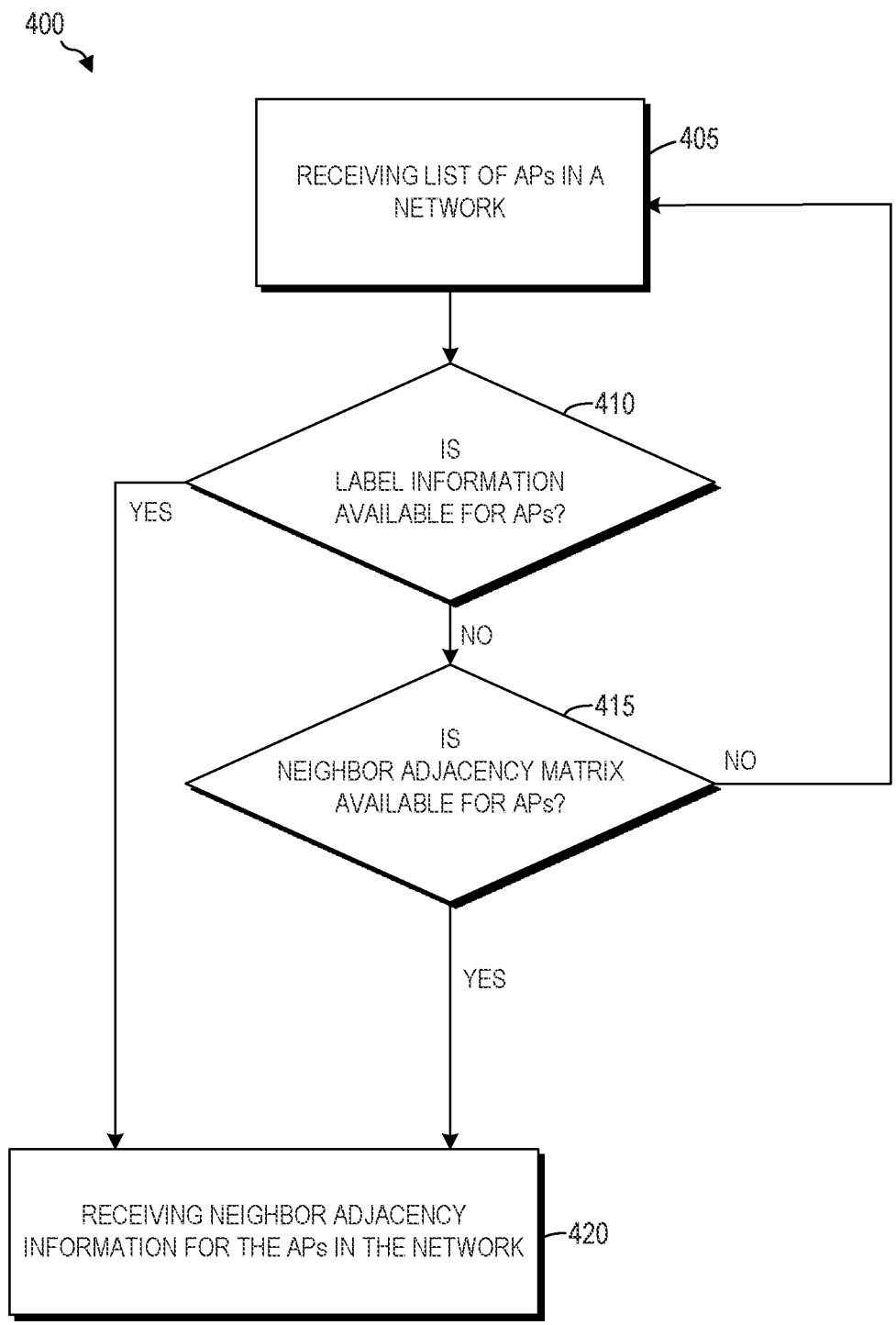
FIG. 4 is a flowchart of an example method for providing coordinated ranging between APs in a network.

Referring to FIG. 4, a flowchart depicting a method 400 for coordinated ranging between APs in a network is presented in some examples. Although the execution of method 400 is described below with reference to computing device 100 of FIG. 1, any suitable computing device for the execution of method 400 may be utilized. Additionally, the implementation of method 400 is not limited to such examples. While method blocks 405 to 420 are shown in method 400, method 400 may include other actions described herein. Additionally, although the blocks are shown in an order, blocks depicted in FIG. 4 may be performed in any suitable order and at any time. Moreover, one or more of blocks of method 400 may be performed in combination with one or more blocks of methods 300, 500, or 600, 800, 900, or 1000. Also, some of the blocks shown in method 400 may be omitted without departing from the spirit and scope of this disclosure.

At block 405, method 400 may include receiving, by computing device 100, a list of APs in a network. The list of APs may correspond to a plurality of APs in a network for which computing device 100 can send or receive communication signal(s) 170 via communication path(s) 160 to perform coordinated ranging between the APs. That is, the list of APs may correspond to a plurality of APs in a network that are capable of ranging. It will be understood that the list of APs received by computing device 100 may have any suitable format. For instance, the list of APs in the network may be indicated by (e.g., included in) one or more data packets which are received by computing device 100.

At block 410, method 400 may include, based on (e.g., in response to) receiving the list of APs in the network, determining, by computing device 100 for each AP in the list of APs, whether label information is available for the AP. At block 410, if it is determined that label information is available for the AP, then method 400 proceeds to receive, by computing device 100, neighbor adjacency information (including the label information) for the AP (as described above in relation to block 305 of method 300). Conversely, at block 410, if it is determined that label information is not available for the AP, then method 400 proceeds to block 415.

At block 415, method 400 may include, based on (e.g., in response to) receiving the list of APs in the network, determining, by computing device 100 for each AP in the list of APs, whether a neighbor adjacency matrix is available for the AP. For example, as shown in FIG. 4, based on a determination (at block 410) that label information is not available for the AP, at block 415, method 400 may include determining, by computing device 100, whether a neighbor adjacency matrix is available for the AP. At block 415, if it is determined that the neighbor adjacency matrix is available for the AP, then method 400 proceeds to receive, by computing device 100, neighbor adjacency information (including the neighbor adjacency matrix) for the AP (as described above in relation to block 305 of method 300). Conversely, at block 410, if it is determined that the neighbor adjacency matrix is not available for the AP, then method 400 returns to block 405 to receive a (new) list of APs in the network. Method 400 may return to block 405 to receive a list of APs in the network after a predetermined time period (e.g., 5 seconds, 1 minute, etc.) has elapsed.

At block 420, based on (e.g., in response to) receiving the list of APs in the network (as described above in relation to one or more of blocks 405, 410, or 415), method 400 may include receiving the neighbor adjacency information for the plurality of APs in the network. Block 420 may include the same or similar steps as described above in relation to block 305 of method 300.

In this manner, example computing device 100 of FIG. 1 (and method 400 of FIG. 4) receives neighbor adjacency information for a plurality of APs in a network which may be used to perform coordinated ranging between the APs (e.g., in a manner described above in relation to method 300), and when such neighbor adjacency information is unavailable, selects another set of APs in the network to perform coordinated ranging.

Figure 5:
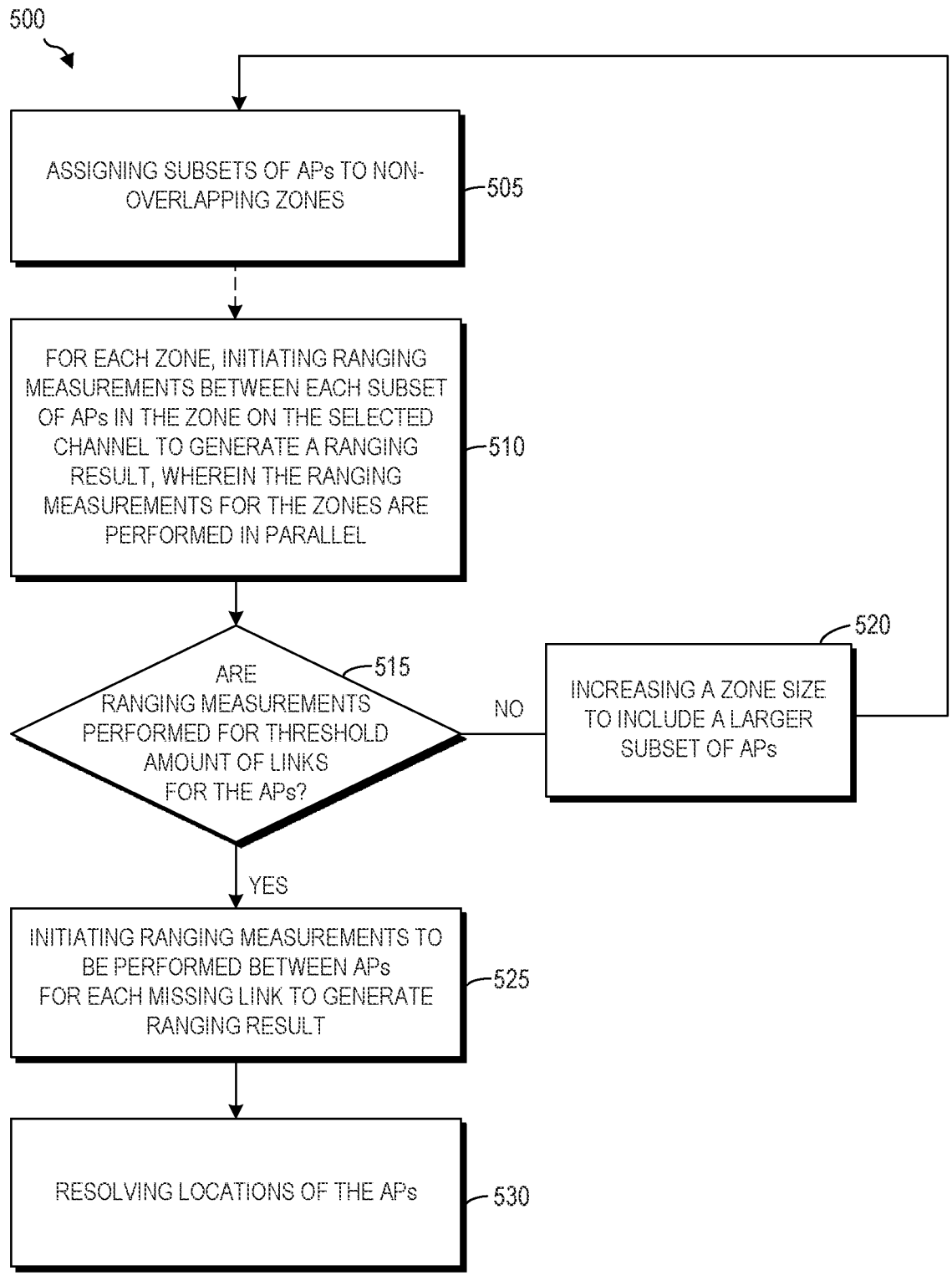
FIG. 5 is a flowchart of an example method for providing coordinated ranging between APs in a network.

Referring to FIG. 5, a flowchart depicting a method 500 for coordinated ranging between APs in a network is presented in some examples. Although the execution of method 500 is described below with reference to computing device 100 of FIG. 1, any suitable computing device for the execution of method 500 may be utilized. Additionally, the implementation of method 500 is not limited to such examples. While method blocks 505 to 530 are shown in method 500, method 500 may include other actions described herein. Additionally, although the blocks are shown in an order, blocks depicted in FIG. 5 may be performed in any suitable order and at any time. Moreover, one or more of blocks of method 500 may be performed in combination with one or more blocks of methods 300, 400, 600, 800, 900, or 1000. Also, some of the blocks shown in method 500 may be omitted without departing from the spirit and scope of this disclosure.

At block 505, method 500 may include assigning the plurality of APs to non-overlapping zones. Block 505 may include the same or similar steps as describe above in relation to block 310 of method 300.

At block 510, method 500 may include, for each of the non-overlapping zones, initiating ranging measurements between the subset of APs in the zone to generate a ranging result, wherein the ranging measurements for the non-overlapping zones are performed in parallel. Block 510 may include the same or similar steps as described above in relation to block 320 of method 300.

At block 515, method 500 may include determining, by computing device 100 for the plurality of APs in the network, whether ranging measurements (for the subsets of APs in the non-overlapping zones) are performed for a threshold amount of links for the plurality of APs.

The threshold amount of links for the plurality of APs may correspond to a threshold ratio of links for the plurality of APs in the network. For instance, method 500 may include determining, by computing device 100, whether ranging measurements for all the subsets of APs (e.g., first subset of APs, second subset of APs) in all the non-overlapping zones (e.g., first zone, second zone) are performed for a threshold ratio of links between pairs of the plurality of APs in the network. The threshold ratio of links may correspond to a ratio between a number of communication links between pairs of the plurality of APs in the network for which ranging measurements are performed, to a number of total available communication links between the plurality of APs in the network. At block 515, if it is determined that the ranging measurements between the subset of APs are not performed for the threshold amount of links, then method 500 proceeds to block 520. Conversely, if it is determined that the ranging measurements are performed for the threshold amount of links, then method 500 proceeds to block 525.

At block 520, method 500 may include increasing a size of the zone to include a larger subset of the APs. That is, at block 520, method 500 may include increasing the size of the zone to include the subset of APs in the existing zone along with other APs of the plurality of APs. In some examples, at block 520, the size of the zone may be increased by a predetermined increment in relation to the size of the existing zone. For example, the size of the zone may be increased by a percentage, e.g., ten percent (10%), of the total area of the existing zone. Moreover, the size of the zone may be increased by adding an area corresponding to a regular shape, e.g., rectangle, circle, etc., or an irregular shape to the existing zone. In some examples, the shape of the increased area added to the existing zone may correspond to one or more partitions (e.g., rooms) of a building.

At block 525, method 500 may include initiating ranging measurements between APs for each missing communication link to generate a ranging result. Block 525 may include similar steps as described above in relation to block 320 of method 300. A missing communication link may correspond to an available communication link for a subset of APs for which ranging measurements have not yet been performed at block 320 of method 300. The ranging result for each missing communication link may be received by computing device 100, in a similar manner as described in relation to block 325 of method 300.

At block 530, based on (e.g., in response to) the ranging measurements performed between the APs for the one or more missing communication link(s), method 500 may include resolving locations of the plurality of APs. Block 530 may include the same or similar steps as described above in relation to block 335 of method 300. For instance, at block 530, the locations of the plurality of APs may be resolved based on both the ranging result(s) generated by computing device 100 at block 320 of method 300 and the ranging result(s) generated by computing device 100 for any missing communication link(s) at block 525 of method 500.

In this manner, example computing device 100 of FIG. 1 (and method 500 of FIG. 5) may improve the reliability (e.g., accuracy) of computing device 100 to resolve the locations of the APs. For instance, computing device 100 may increase a size of the zone to include a larger subset of the APs when ranging measurements are not performed for a threshold amount of links (at block 520), and may perform ranging measurements for any missing communication link(s) between the APs (at block 525) in a network during coordinated ranging between the APs, thereby ensuring that the ranging measurements account for a sufficient amount of links between the APs to generate reliable (e.g., accurate) ranging results, which may then be used to accurately resolve locations of the APs in the network (at block 530.)

Figure 6:
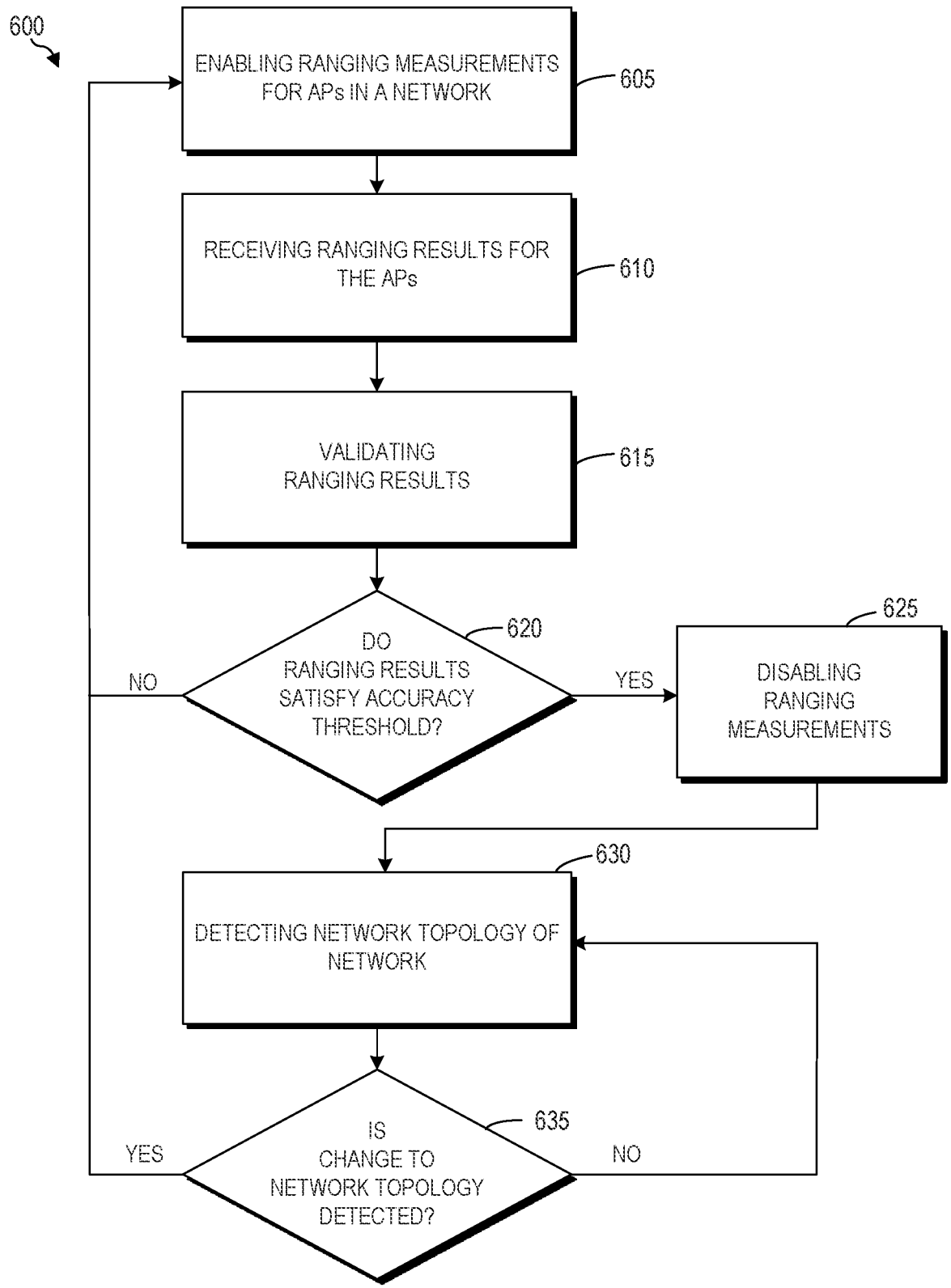
FIG. 6 is a flowchart of an example method for providing coordinated ranging between APs in a network.

Referring to FIG. 6, a flowchart depicting a method 600 for coordinated ranging between APs in a network is presented in some examples. Although the execution of method 600 is described below with reference to computing device 100 of FIG. 1, any suitable computing device for the execution of method 600 may be utilized. Additionally, the implementation of method 600 is not limited to such examples. While method blocks 605 to 635 are shown in method 600, method 600 may include other actions described herein. Additionally, although the blocks are shown in an order, blocks depicted in FIG. 6 may be performed in any suitable order and at any time. Moreover, one or more of blocks of method 600 may be performed in combination with one or more blocks of methods 300, 400, 500, 800, 900, or 1000. Also, some of the blocks shown in method 600 may be omitted without departing from the spirit and scope of this disclosure.

At block 605, method 600 may include enabling, by computing device 100, ranging measurements for a plurality of APs in a network. By enabling ranging measurements for the plurality of APs, computing device 100 may then initiate ranging measurements between the plurality of APs (as described above in relation to block 320 of method 300.) The enabling and disabling of ranging measurements by computing device 100 may be implemented as a toggle that can be set on or off, either automatically or manually (e.g., in response to an input from a user.) Computing device 100 may be configured (e.g., encoded with instructions executable by at least one processing resource 100) to include the toggle.

At block 610, method 600 may include receiving, by computing device 100, ranging results for the plurality of APs. In some examples, block 610 may include the same or similar steps as block 325 of method 300 to receive, by computing device 100, ranging results for the plurality of APs.

At block 615, method 600 may include validating, by computing device 100, the ranging results. The ranging results may be validated based on one or more of methods 800, 900, or 1000, as further described below.

At block 620, method 600 may include determining, by computing device 100, whether the ranging results satisfy an accuracy threshold. For instance, the accuracy threshold may correspond to a deviation threshold of a ranging result for a pair of APs of a subset of APs in a zone (as described below in relation to method 700 in FIG. 7.) At block 620, if it is determined the ranging results satisfy the accuracy threshold (e.g., a ranging result for a pair of APs of a subset of APs in a zone is within the deviation threshold), then method 600 proceeds to block 625. Conversely, at block 620, if it is determined that the ranging results do not satisfy the accuracy threshold (e.g., a ranging result for a pair of APs in a subset of APs in a zone is outside of the deviation threshold), then method 600 returns to block 605. Method 600 may return to block 605 to enable ranging measurements for the plurality of APs in the network after a predetermined time period (e.g., 5 seconds, 1 minute, etc.) has elapsed.

At block 625, method 600 may include disabling, by computing device 100, ranging measurements for the plurality of APs in the network. As noted above in relation to block 605, the enabling and disabling of ranging measurements by computing device 100 may be implemented as a toggle that can be set on or off.

At block 630, method 600 may include detecting, by computing device 100, a network topology of the network. The network topology may indicate the devices (e.g., computing device 100, APs, client devices, etc.) that are connected to the network and the connections (e.g., communication links) between such devices.

At block 635, method 600 may include determining whether there is change to the network topology. A change to the network topology may be detected, for instance, when one or more devices (e.g., APs) are added to the network, one or more devices (e.g., APs) are removed from service (e.g., turned off, malfunction) in the network, one or more devices (e.g., APs) change locations in the network, or a combination thereof. At block 635, if it is determined that there is a change to the network topology, then method 600 returns to block 605 (i.e., ranging measurements are re-enabled.) Conversely, at block 635, if it is determined that there is no change to the network topology, then method 600 returns to block 630 to determine if there is subsequently a change to the network topology. Method 600 may return to block 605 to determine if there is subsequently a change to the network topology after a predetermined time period (e.g., 5 seconds, 1 minute, etc.) has elapsed.

In this manner, example computing device 100 of FIG. 1 (and method 600 of FIG. 6) may disable ranging by APs in a network when coordinated ranging between the APs generate ranging results that satisfy an accuracy threshold, and re-enable ranging by the APs when there is a change in the network topology (and continue to check for changes to the network topology), thus providing efficient coordinated ranging between the APs which accounts for changes to the network topology.

System/Computing System

Figure 2:
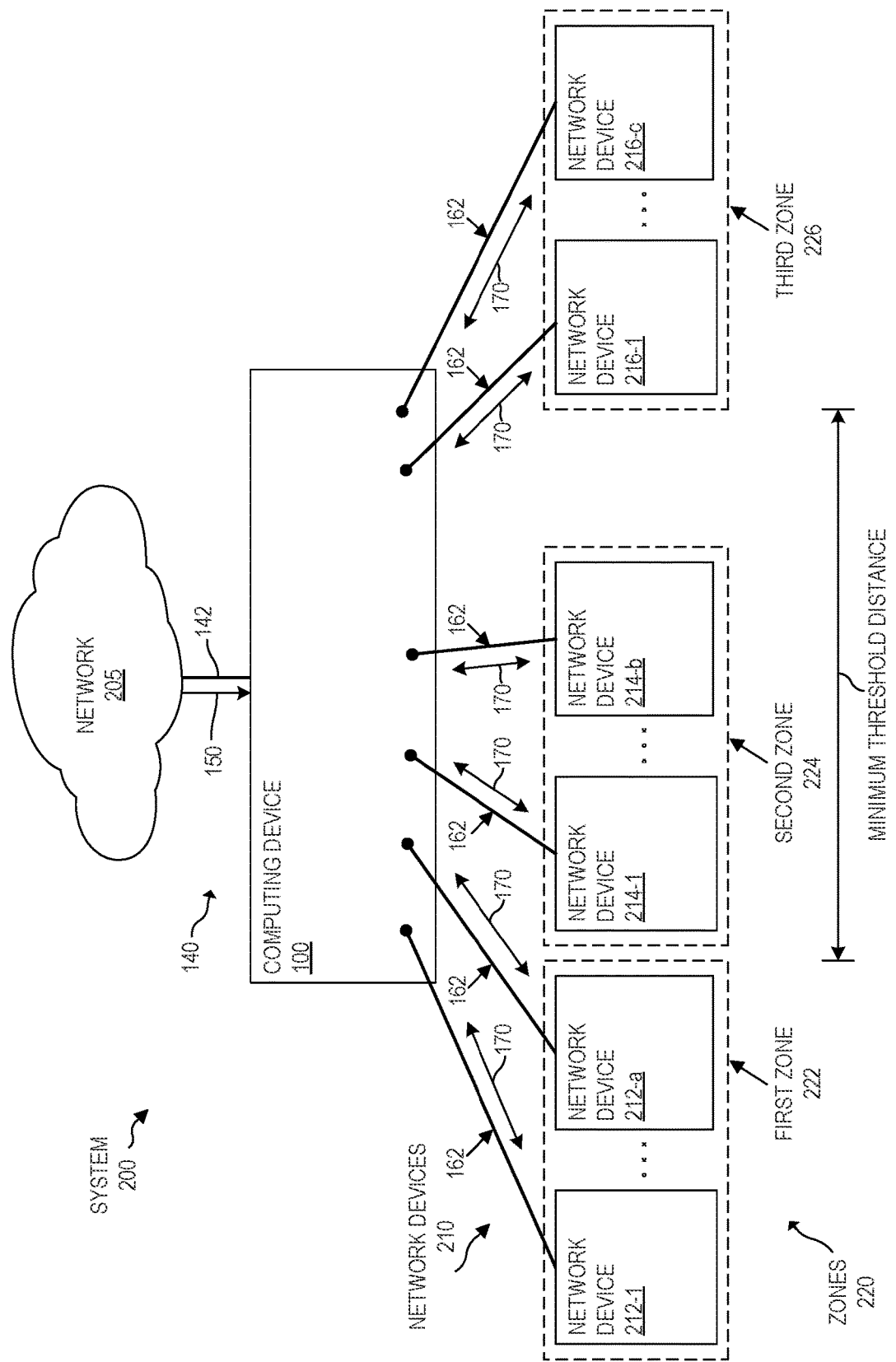
FIG. 2 shows a block diagram for an example system for providing coordinated ranging between APs in a network.

FIG. 2 is a block diagram of an example system 200 including a computing device for coordinated ranging between APs in a network. System 200 includes computing device 100 (as described above in relation to FIG. 1) that is connected to a network 205. In addition, system 200 includes a plurality of network devices 210 that are connected to network 205. Network devices 210 include a plurality of network devices 212-1 to 212-$a$ (a first subset of network devices 210), network devices 214-1 to 214-$b$ (a second subset of network devices 210), and network device 216-1 to 216-$c$ (a third subset of network devices 210), wherein a, b, and c are integers and represent a total number of the network devices 212-1 to 212-$a$, network devices 214-1 to 214-$b$, and network devices 216-1 to 216-$c$, respectively. It will be understood that any suitable number of network devices 210 (and any suitable subset of network devices 210) may be connected to network 205.

In the example of FIG. 2, network 205 may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. In addition, network 205 may comprise one or more cellular networks using one or more mobile communications standards (e.g., 3G, 4G, 5G, etc.). It will be understood that system 200 may comprise any suitable type(s) of network(s) 205. Moreover, although FIG. 2 shows that a single computing device 100 is connected to network 205, it will be understood that any suitable number of computing devices (in addition to computing device 100) may be connected to network 205.

In the example of FIG. 2, each of the network devices 210 includes a radio (not shown) to communicate with computing device 100, with one or more other network device 210, or a combination thereof. The radio(s) may generate a signal in one or more frequency bands, process a signal in one or more frequency bands, or a combination thereof. The radio (s) of network devices 210 may operate at any suitable frequency band(s) and conform to any suitable type(s) of wireless communication standards, now known or later developed. For instance, one or more radios of network devices 210 may operate at one or more channels in the 2.4 GHz band and/or 5 GHz band, in accordance with the IEEE 802.11ac and/or 802.11ax standards. Moreover, each of network devices 210 may each include one, two, or any other suitable number(s) of radios.

In the example of FIG. 2, each of the network devices 210 may communicate with one or more client devices (e.g., communication devices) that are connected to the network device. For instance, one or more communication devices such as a laptop computer, a desktop computer, a mobile device, and/or other wireless devices, etc., may be connected to one or more network devices 210. Each of the network devices 210 may communicate with one or more client devices via a radio. In examples described herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices.

In the example of FIG. 2, computing device 100 may be configured to receive network request(s) 150 via a network path(s) 140 to establish communication with one or more of network devices 210 (as described above in relation to FIG. 1.) For instance, computing device 100 may receive a signal from network 205 containing network request 150 (as described above in relation to FIG. 1.)

In the example of FIG. 2, computing device 100 may be configured to send or receive communication signal(s) 170 via communication path(s) 160 to establish communication with one or more network devices 210 (as described above in relation to FIG. 1.)

In the example of FIG. 2, network devices 210 may engage in any network data transmission operations, including, but not limited to, switching, routing, bridging, or a combination thereof. In addition, one or more network devices 210 may comprise a wireless AP (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood that network devices 210 may include any suitable type(s) of network device(s) made by any suitable manufacturer(s).

In the example of FIG. 2, computing device 100 is configured to (e.g., encoded with non-transitory machine-readable instructions executable by at least one processing resource 110) to perform AP neighbor adjacency information receiving instructions 122, AP zone assigning instructions 124, coordinated ranging initiating instructions 126, and AP location resolving instructions 128, as described above in relation to FIG. 1.

For example, computing device 100 may be configured to receive neighbor adjacency information for network device 210 in network 205. Based on (e.g., in response to) the received neighbor adjacency information, computing device 100 may be configured to assign network devices 210 to non-overlapping zones 220. For instance, as shown in FIG. 2, computing device 100 may assign network devices 212-1 to 212-a (i.e., a first subset of network devices 210) to first zone 222, assign network devices 214-1 to 214-b (i.e., a second subset of network devices 210) to second zone 224, and assign network devices 216-1 to 216-c (i.e., a third subset of network devices 210) to third zone 226. Although FIG. 2 illustrates three zones 222, 224 and 226, it will be understood that zones 220 may include two, ten, fifty, or any suitable number of zones, and that each zone may include two, ten, fifty, or any suitable number of network devices 210.

In addition, computing device 100 may be configured, for each of the non-overlapping zones 220, to select a channel for the subset of APs in the zone. For instance, computing device may select a first channel for network devices 212-1 to 212-a in first zone 222, and select a second channel for network devices 214-1 to 214-b in second zone 224, wherein the first channel is different than the second channel. First zone 222 and second zone 224 may be proximate (or directly adjacent) to each other, such that a distance between first zone 222 and second zone 224 is less than minimum threshold distance 230.

In addition, computing device 100 may be configured to initiate ranging measurements between network devices 210 in each of the zones 220 to generate ranging results, wherein the ranging measurements are performed in parallel. For instance, computing device 100 may initiate first ranging measurements between network devices 212-1 to 212-a on the first channel to generate a first ranging result, and initiate second ranging measurements between network devices 214-1 to 214-b on a second channel to generate a second ranging result, wherein the first and second ranging measurements are performed in parallel. Based on (e.g., in response to) the first ranging result and the second ranging result, computing device 100 may be configured to resolve locations of network devices 210.

In this manner, example system 200 of FIG. 2 provides coordinated ranging of network devices 210 in network 205. For instance, computing device 100 may, based on receiving neighbor adjacency information from network devices 210, assign network devices 210 to non-overlapping zones 220, wherein a first subset of network devices 212-1 to 212-a is assigned to first zone 222 and a second subset of network devices 214-1 to 214-b is assigned to second zone 224, thereby assigning subsets of proximate (neighboring) network devices 210 to non-overlapping zones 220 which can be used to perform efficient coordinated ranging between network devices 210. Moreover, computing device 100 may initiate first ranging measurements between a first subset of network devices 212-1 to 212-*a* on a first channel to generate a first ranging result, and initiate second ranging measurements between a second subset of network devices 214-1 to 214-*b* on a second channel to generate a second ranging result, wherein the first ranging measurements and the second ranging measurements are performed in parallel, thus reducing airtime overhead by decreasing the airtime for completing the ranging measurements between network devices 210. Moreover, when the distance between two zones (e.g., first zone 222, second zone 224) is less than a minimum threshold distance (e.g., minimum threshold distance 230), computing device 100 may initiate coordinated ranging measurements for the zones on different channels (e.g., first channel, second channel) to minimize interference between network devices in the different zones.

Furthermore, computing device 100 may be configured to select the first channel for network devices 216-1 to 216-*c* in third zone 226. A distance between first zone 222 and third zone 226 is greater than or equal to minimum threshold distance 230. In addition, computing device 100 may be configured to initiate third ranging measurements between network devices 216-1 to 216-*c* on the first channel to generate a third ranging result, wherein the third ranging measurements are performed in parallel with the first ranging measurements and the second ranging measurements. Based on (e.g., in response to) the third ranging result, computing device 100 may be configured to resolve the locations of network devices 210.

In this manner, example system of FIG. 2 may ensure that when coordinated ranging measurements are performed by network devices 210 in two or more non-overlapping zones (e.g., first zone 222, third zone 223) on a same channel, that a distance between such zones is greater than or equal to a minimum threshold distance (e.g., minimum threshold distance 230) to prevent interference between ranging measurements by network devices 210 in each of the two or more non-overlapping zones, thereby improving the reliability (e.g., accuracy) of the coordinated ranging measurements.

Figure 7:
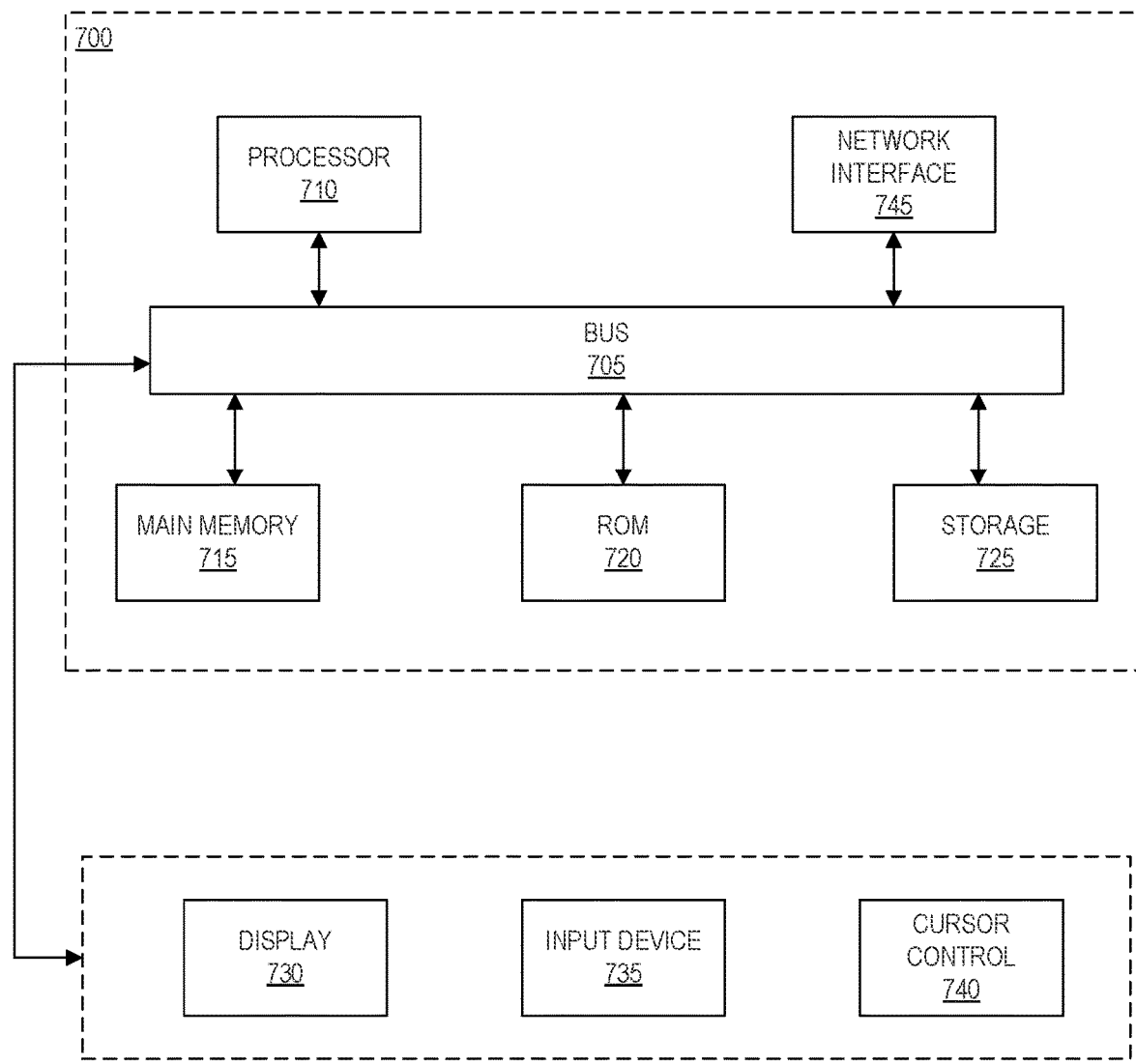
FIG. 7 is a block diagram of an example computer system in which various embodiments described herein may be implemented for providing coordinated ranging between APs in a network.

FIG. 7 is a block diagram of an example computer system 700 in which various embodiments described herein may be implemented for coordinated ranging between access points in a network.

Computer system 700 includes bus 705 or other communication mechanism for communicating information, at least one hardware processor 710 coupled with bus 705 for processing information. At least one hardware processor 710 may be, for example, at least one general purpose microprocessor.

Computer system 700 also includes main memory 715, such as random access memory (RAM), cache, other dynamic storage devices, or the like, or a combination thereof, coupled to bus 705 for storing information and one or more instructions to be executed by at least one processor 710. Main memory 715 also may be used for storing temporary variables or other intermediate information during execution of one or more instructions to be executed by at least one processor 710. In some examples, the one or more instructions may comprise one or more of AP neighbor adjacency information receiving instructions 122, AP zone assigning instructions 124, coordinated ranging initiating instructions 126, and AP location resolving instructions 128 (as described above in relation FIGS. 1-6), one or more instructions to validate ranging results between APs in a network (as described below in relation to FIGS. 8-10), or a combination thereof. Such one or more instructions, when stored on storage media accessible to at least one processor 710, render computer system 700 into a special-purpose machine that is customized to perform the operations specified in the one or more instructions.

Computer system 700 may further include read only memory (ROM) 720 or other static storage device coupled to bus 705 for storing one or more instructions to be executed by at least one processor 710. In some examples, the one or more instructions may comprise one or more of AP neighbor adjacency information receiving instructions 122, AP zone assigning instructions 124, coordinated ranging initiating instructions 126, and AP location resolving instructions 128 (as described above in relation FIGS. 1-6), one or more instructions to validate ranging results between APs in a network (as described below in relation to FIGS. 8-10), or a combination thereof. Such one or more instructions, when stored on storage media accessible to at least one processor 710, render computer system 700 into a special-purpose machine that is customized to perform the operations specified in the one or more instructions.

Computer system 700 may further include information and one or more instructions for at least one processor 710. At least one storage device 725, such as a magnetic disk, optical disk, or USB thumb drive (Flash drive), or the like, or a combination thereof, may be provided and coupled to bus 705 for storing information and one or more instructions. In some examples, the one or more instructions may comprise one or more of AP neighbor adjacency information receiving instructions 122, AP zone assigning instructions 124, coordinated ranging initiating instructions 126, and AP location resolving instructions 128 (as described above in relation FIGS. 1-6), one or more instructions to validate ranging results between APs in a network (as described below in relation to FIGS. 8-10), or a combination thereof.

Computer system 700 may further include display 730 coupled to bus 705 for displaying a graphical output to a user. The computer system 700 may further include input device 735, such as a keyboard, camera, microphone, or the like, or a combination thereof, coupled to bus 705 for providing an input from a user. Computer system 700 may further include cursor control 740, such as a mouse, pointer, stylus, or the like, or a combination thereof, coupled to bus 705 for providing an input from a user.

Computer system 700 may further includes at least one network interface 745, such as a network interface controller (NIC), network adapter, or the like, or a combination thereof, coupled to bus 705 for connecting computer system 700 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 based on (e.g., in response to) at least one processor 710 executing one or more sequences of one or more instructions contained in main memory 715. Such one or more instructions may be read into main memory 715 from another storage medium, such as at least one storage device 725. Execution of the sequences of one or more instructions contained in main memory 715 causes at least one processor 710 to perform the process steps described herein. In alternative embodiments, hard-wired circuitry may be used in place of or in combination with software instructions.

Validating Ranging Measurements

Figure 8:
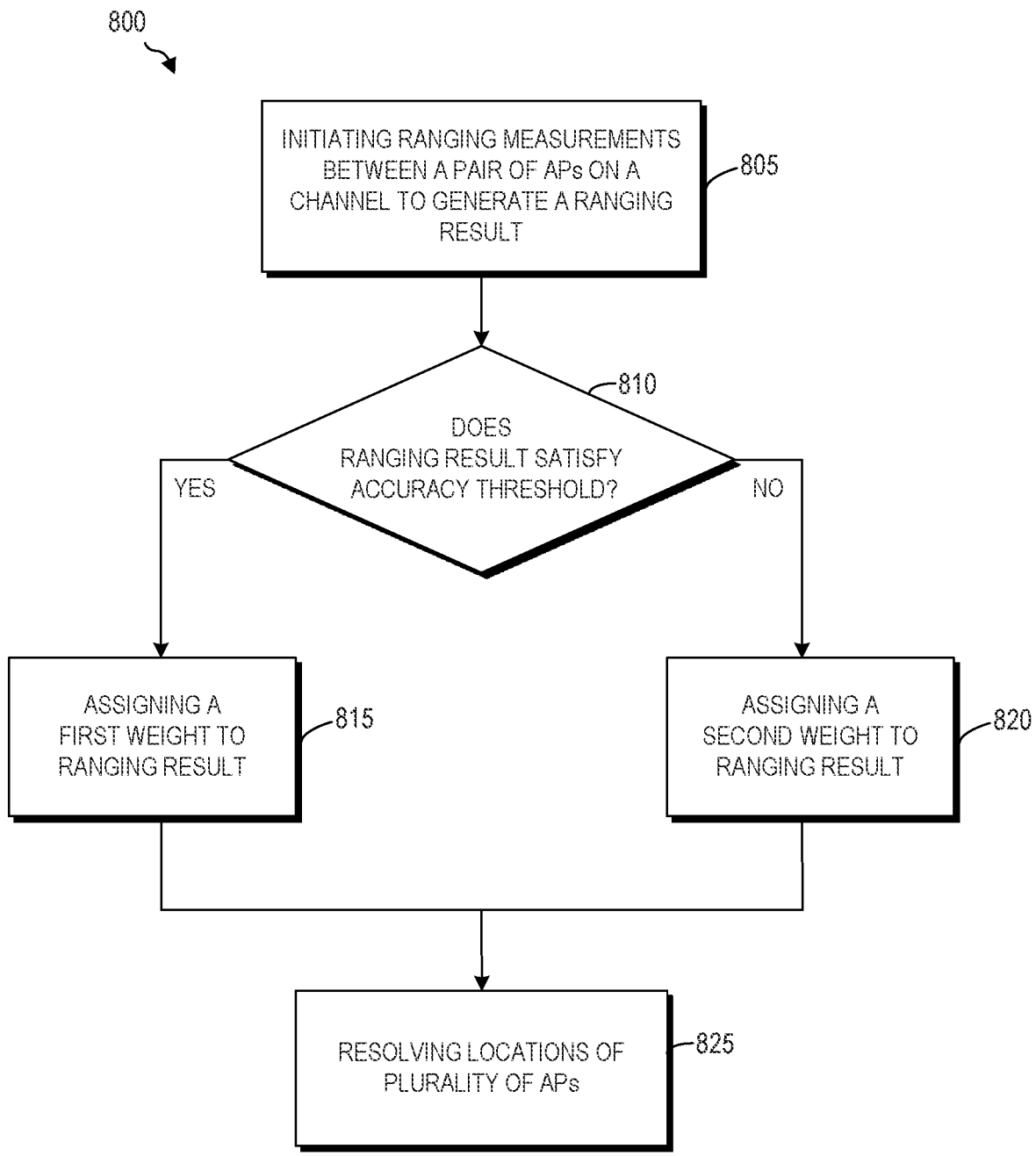
FIG. 8 is a flowchart of an example method for validating ranging results between APs in a network.

Referring to FIG. 8, a flowchart depicting a method 800 for validating ranging results between APs in a network is presented in some examples. Although the execution of method 800 is described below with reference to computing device 100 of FIG. 1, any suitable computing device for the execution of method 800 may be utilized. Additionally, the implementation of method 800 is not limited to such examples. While method blocks 805 to 825 are shown in method 800, method 800 may include other actions described herein. Additionally, although the blocks are shown in an order, blocks depicted in FIG. 8 may be performed in any suitable order and at any time. Moreover, one or more of blocks of method 800 may be performed in combination with one or more blocks of methods 300, 400, 500, 600, 900, or 1000. Also, some of the blocks shown in method 800 may be omitted without departing from the spirit and scope of this disclosure.

At block 805, method 800 may include, initiating ranging measurements between a pair of APs on a channel (e.g., first channel) to generate a ranging result for the pair of APs on the channel. Block 805 may include the same or similar steps as described above in relation to block 320 of method 300. Specifically, the ranging result for the pair of APs on the channel may be determined by initiating, for each of the non-overlapping zones, a ranging measurement between the subset of APs in the zone to generate a ranging result, wherein the ranging measurements for the non-overlapping zones are performed in parallel (as described above in relation to block 320 of method 300.) That is, each ranging result for a subset of APs on a channel may include a ranging result for one or more pairs of APs of the subset of APs on the channel. Moreover, method 800 may include receiving (by computing device 100) the ranging result for the pair of APs on the channel (in the same or similar manner as described above in relation to block 325 of method 300.)

At block 810, method 800 may include determining whether the ranging result satisfies an accuracy threshold. Specifically, at block 810, method 800 may include determining, for a pair of APs in a subset of APs, whether the ranging result satisfies an accuracy threshold for the pair of APs.

The accuracy threshold may correspond to a deviation threshold for the ranging result for one or more pair of APs of a plurality of APs in a network. For instance, after computing device initiates ranging measurements between a pair of APs on a channel to generate a ranging result (at block 805), computing device 100 may determine, for the pair of APs, whether the ranging result for the pair of APs is within the deviation threshold for a plurality of APs in a network. It will be understood that the deviation threshold may be set to any suitable value. For example, the deviation threshold may be set to 20 ns from an average RTT measurement for one or more pairs of APs of a plurality of APs in a network. At block 810, if it is determined that the ranging result for the pair of APs satisfies the accuracy threshold (e.g., is within the deviation threshold), then method 800 proceeds to block 815. Conversely, at block 810, if it is determined that the ranging result for the pair of APs does not satisfy the accuracy threshold (e.g., is outside of the deviation threshold), then method 800 proceeds to block 820.

At block 815, method 800 may include assigning, by computing device 100, a first weight to the ranging result for the pair of APs. At block 820, method 800 may include assigning, by computing device 100, a second weight to the ranging result for the pair of APs, wherein the second weight is less than the first weight.

A given weight (e.g. first weight, second weight) assigned to a ranging result for a pair of APs may include a numerical value that is multiplied to the ranging result for the pair of APs. In some examples, the first weight and the second weight may correspond to binary values. For instance, the first weight may have a value of one, whereas the second weight may have a value of zero. In such example, when computing device 100 assigns a second weight of zero to a ranging result for a pair of APs, that ranging result for the pair of APs is not factored (i.e., is disregarded) when computing device 100 resolves the location of the plurality of APs in the network based on the ranging results of the plurality of APs (e.g., as described above in relation to block 335 of method 300.) In other examples, the first weight and/or second weight may correspond to non-binary values. For example, the first weight may have a binary value of one, whereas the second weight may have a non-binary value of 0.5. It will be understood that a weight assigned to the ranging result for a pair of APs may have any suitable value.

At block 825, based on the assigned weight (e.g., first weight, second weight) to the ranging result, method 800 may include resolving locations of the plurality of APs. Block 825 may include the same or similar steps as described above in relation to block 335 of method 300.

In this manner, example computing device 100 of FIG. 1 (and method 800 of FIG. 8) may improve the reliability (e.g., accuracy) of ranging results which are used to perform automatic location of APs in a network by validating the ranging results. For instance, computing device 100 may assign a lesser weight (e.g., a weight of zero) to a ranging result for a pair of APs which fall outside of a deviation threshold (at block 820), and thereby increase the reliability (e.g., accuracy) of computing device 100 to resolve locations of the plurality of APs in the network based on the ranging results (at block 825.) That is, computing device 100 may give lesser weight to (e.g., disregard) a ranging result between a pair of APs which would otherwise skew the location estimations of the plurality of APs in the network.

Figure 9:
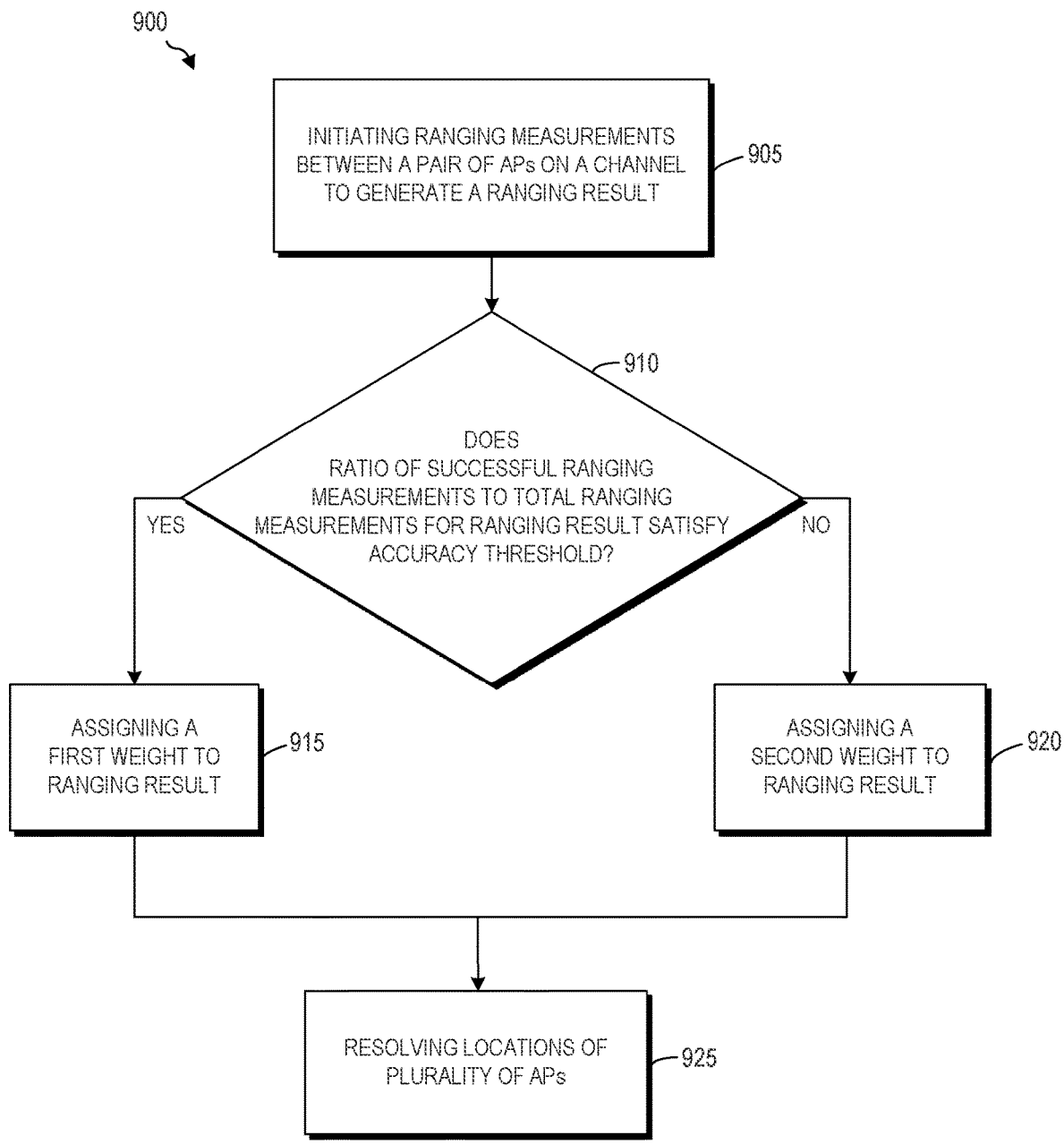
FIG. 9 is a flowchart of an example method for validating ranging results between APs in a network.

Referring to FIG. 9, a flowchart depicting a method 900 for validating ranging results between APs in a network is presented in some examples. Although the execution of method 900 is described below with reference to computing device 100 of FIG. 1, any suitable computing device for the execution of method 900 may be utilized. Additionally, the implementation of method 900 is not limited to such examples. While method blocks 905 to 925 are shown in method 900, method 900 may include other actions described herein. Additionally, although the blocks are shown in an order, blocks depicted in FIG. 9 may be performed in any suitable order and at any time. Moreover, one or more of blocks of method 900 may be performed in combination with one or more blocks of methods 300, 400, 500, 600, 800, or 1000. Also, some of the blocks shown in method 900 may be omitted without departing from the spirit and scope of this disclosure.

At block 905, method 900 may include initiating ranging measurements between a pair of APs on a channel (e.g., first channel) to generate a ranging result for the pair of APs on the channel. Block 905 may include the same or similar steps as described above in relation to block 320 of method 300. Specifically, the ranging result for the pair of APs on the channel may be determined by initiating, for each of the non-overlapping zones, ranging measurements between the subset of APs in the zone to generate a ranging result, wherein the ranging measurements for the non-overlapping zones are performed in parallel (as described above in relation to block 320 of method 300.) That is, each ranging result for a subset of APs on a channel may include a ranging result for one or more pairs of APs of the subset of APs on the channel. Moreover, method 900 may include receiving (by computing device 100) the ranging result for the pair of APs on the channel (in the same or similar manner as described above in relation to block 335 of method 300.)

At block 910, method 900 may include determining, by computing device 100 whether a ratio of successful ranging measurements to total ranging measurements of the ranging result for the pair of APs satisfies an accuracy threshold. At block 910, if it is determined the ratio of successful ranging measurements to total ranging measurements between the pair of APs satisfies the accuracy threshold, then method 900 proceeds to block 915. Conversely, at block 910, if it is determined that the ratio of successful ranging measurements to total ranging measurements between the pair of APs does not satisfy the accuracy threshold, then method 900 proceeds to block 920.

The accuracy threshold may correspond to a ratio of successful ranging measurements to total ranging measurements, e.g., 0.5, 0.75, 0.95, etc. Computing device 100 may determine that the ratio of successful ranging measurements to total ranging measurements satisfies the accuracy threshold when it is greater than or equal to the threshold ratio. For example, at block 910, method 900 may include determining, by computing device 100, whether the ratio of successful ranging measurements to total ranging measurements for a pair of APs is greater than or equal to 0.75. In such example, when the ratio for the pair of APs is greater than of equal to 0.75 (i.e., satisfies the accuracy threshold), computing device 100 may determine that the ranging result for the pair of APs is reliable. Conversely, in such example, when the ratio for the pair of APs does not satisfy is less than 0.75 (i.e., is less than the accuracy threshold), computing device 100 may determine that the ranging result is unreliable (or less reliable.) It will be understood that the accuracy threshold may correspond to 0.5, 0.75, 0.95, or any suitable ratio.

At block 915, method 900 may include assigning, by computing device 100, a first weight to the ranging result of the pair of APs. At block 920, method 900 may include assigning, by computing device 100, a second weight to the ranging result of the pair of APs, wherein the second weight is less than the first weight.

As described above in relation to method 800, a given weight (e.g. first weight, second weight) assigned to a ranging result includes a numerical value that is multiplied to the ranging result. As described above in relation to method 800, it will be understood that any suitable value may be used for a weight assigned to a ranging result.

At block 925, based on a weight (e.g., first weight, second weight) assigned to the ranging result of the pair of APs, method 900 may include resolving locations of the plurality of APs. Block 925 may include the same or similar steps as described above in relation to block 335 of method 300.

In this manner, example computing device 100 of FIG. 1 (and method 900 of FIG. 9) may improve the reliability (e.g., accuracy) of ranging results which are used to perform automatic location of APs in a network by validating the ranging results. For instance, computing device 100 may assign a lesser weight (e.g., a weight of zero) to a ranging result for a pair of APs for which a ratio of successful ranging measurements to total ranging measurements does not satisfy an accuracy threshold (at block 920), and thereby increase the reliability (e.g., accuracy) of computing device 100 to resolve locations of the plurality of APs in the network based on the ranging results (at block 925.) That is, computing device 100 may give lesser weight to (e.g., disregard) a ranging result between a pair of APs which would otherwise skew the location estimations of the APs.

Figure 10:
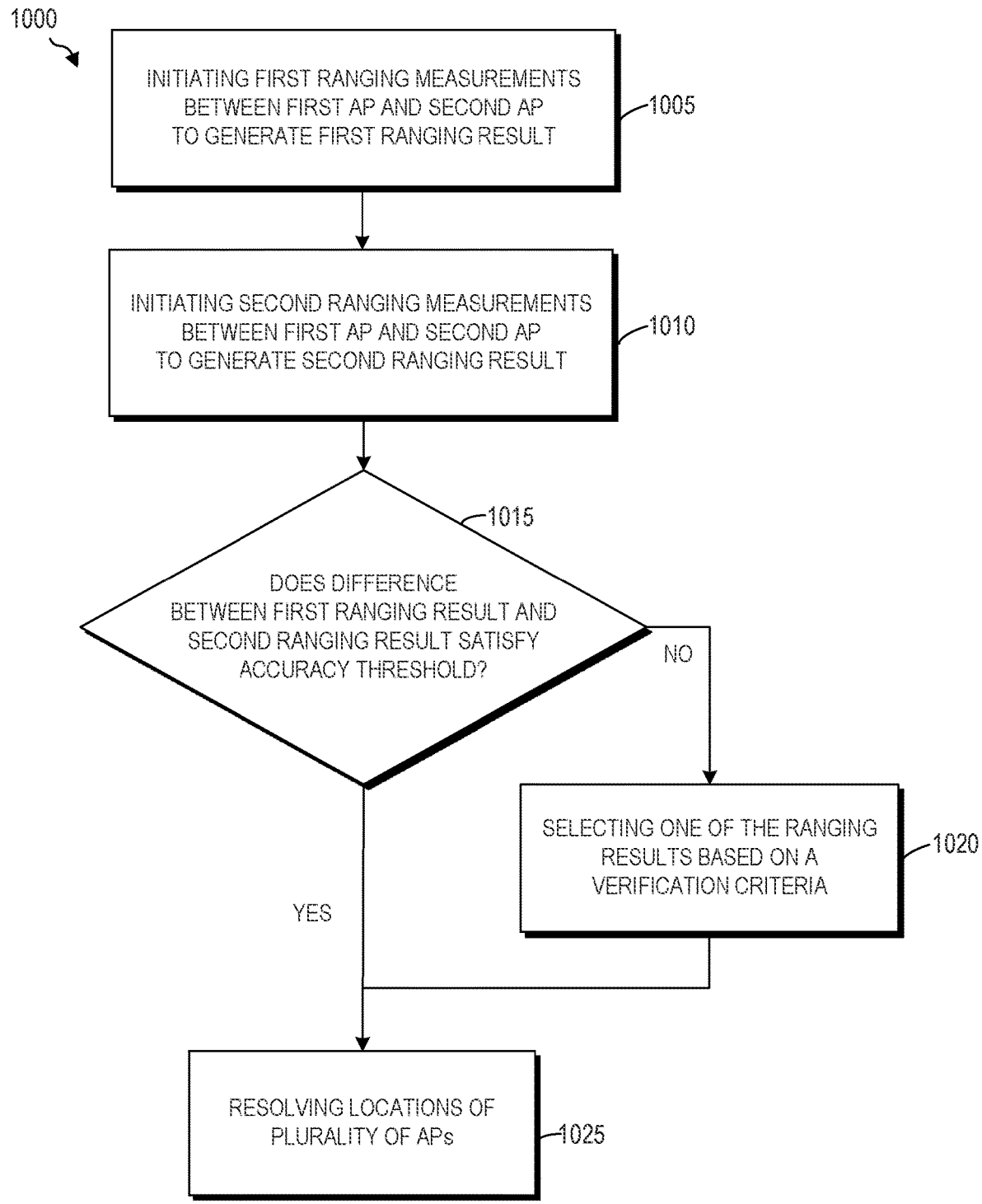
FIG. 10 is a flowchart of an example method for validating ranging results between APs in a network.

Referring to FIG. 10, a flowchart depicting a method 1000 for validating ranging results between APs in a network is presented in some examples. Although the execution of method 1000 is described below with reference to computing device 100 of FIG. 1, any suitable computing device for the execution of method 1000 may be utilized. Additionally, the implementation of method 1000 is not limited to such examples. While method blocks 1005 to 1025 are shown in method 1000, method 1000 may include other actions described herein. Additionally, although the blocks are shown in an order, blocks depicted in FIG. 10 may be performed in any suitable order and at any time. Moreover, one or more of blocks of method 1000 may be performed in combination with one or more blocks of methods 300, 400, 500, 600, 800, or 900. Also, some of the blocks shown in method 1000 may be omitted without departing from the spirit and scope of this disclosure.

At block 1005, method 1000 may include initiating, by computing device 100, first ranging measurements between a first AP and a second AP (i.e. a pair of APs) on a channel to generate a first ranging result. The first ranging measurements may correspond to round trip time (RTT) measurements performed by the first AP between the first AP and the second AP on the channel. Moreover, the first ranging measurements may correspond to channel state information (CSI) between the first AP and the second AP on the channel. Block 1005 may include the same or similar steps as described above in relation to block 320 of method 300. Specifically, the first ranging result for the first AP and the second AP on the channel may be determined by initiating, for each of the non-overlapping zones, ranging measurements between the subset of APs in the zone to generate the first ranging result, wherein the ranging measurements for the non-overlapping zones are performed in parallel (as described above in relation to block 320 of method 300.) That is, a ranging result for a subset of APs on a channel may include the first ranging result for the first AP and the second AP on the channel. Moreover, method 1000 may include receiving (by computing device 100) the first ranging result for the first AP and the second AP on the channel (in the same or similar manner as described above in relation to block 325 of method 300.)

At block 1010, method 1000 may include initiating, by computing device 100, second ranging measurements between the first AP and the second AP (i.e., the pair of APs) on a channel to generate the second ranging result. The second ranging measurements may correspond to RTT measurements performed by the second AP between the first AP and the second AP on the channel. Moreover, the second ranging measurements may correspond to CSI between the first AP and the second AP on the channel. Block 1010 may include the same or similar steps as described above in relation to block 320 of method 300. Specifically, the second ranging result for the first AP and the second AP on the channel may be determined by initiating, for each of the non-overlapping zones, ranging measurements between the subset of APs in the zone to generate a ranging result, wherein the ranging measurements for the non-overlapping zones are performed in parallel (as described above in relation to block 320 of method 300.) That is, a ranging result for a subset of APs on a channel may include the second ranging result for the first AP and the second AP on the channel. Moreover, method 1000 may include receiving (by computing device 100) the second ranging result for the first AP and the second AP on the channel (in the same or similar manner as described above in relation to block 325 of method 300.)

As used herein, an RTT (also known as a round trip delay or ping time) corresponds to a period of time for a signal (e.g., a data packet) to travel across a network from a starting point (e.g., a first network device) to a destination point (e.g., a second network device) and for an acknowledgement of that signal to be returned to the starting point. The RTT measurement may be based on propagation delay, processing delay, queuing delay, encoding delay, or a combination thereof. It will be understood that the RTT may be computed based on any suitable techniques in accordance with any suitable protocol(s) (e.g., Transmission Control Protocol).

As used herein, CSI refers to known channel properties of a wireless signal between a transmitter and a receiver (e.g., between a first AP and a second AP.) CSI is used to determine how a wireless signal propagates between the transmitter and the receiver and represents the combined effect, for example, of scattering, fading, and power decay of the transmitted wireless signal with distance.

At block 1015, method 1000 may include determining, by computing device 100, whether a difference between the first ranging result and the second ranging result satisfies an accuracy threshold. For instance, at block 1015, method 1000 may include determining, by computing device 100, whether a difference between a first RTT measurement (based on first ranging measurements performed by the first AP between the first and second APs) and a second RTT measurement (based on the second ranging measurements performed by the second AP between the first and second APs) satisfies an accuracy threshold. Moreover, at block 1015, method 1000 may include determining, by computing device 100, whether a difference between a first CSI measurement (based on first ranging measurements performed by the first AP between the first and second APs) and a second CSI measurement (based on second ranging measurements performed by the second AP between the first and second APs) satisfies an accuracy threshold. The accuracy threshold may correspond to a deviation threshold between RTT measurements, CSI measurements, or a combination thereof. For example, the deviation threshold may be set to 20 ns between the first RTT measurement and the second RTT measurement. At block 1015, if it is determined that the difference between the first ranging result and the second ranging result satisfies the accuracy threshold (e.g., a difference between the first and second RTT measurements is within a deviation threshold of 20 ns), then method 1000 proceeds to block 1025. Conversely, at block 1015, if it is determined that the difference between the first ranging result and the second ranging result does not satisfy the accuracy threshold (e.g. a difference between the first and second RTT measurements is not within a deviation threshold of 20 ns), then method 1000 proceeds to block 1020.

At block 1020, method 1000 may include selecting, by computing device 100, one of the first and second ranging results based on a verification criteria.

In some examples, the verification criteria may be based on a ratio of successful ranging measurements to total ranging measurements for each of the ranging measurements (e.g., first ranging measurements, second ranging measurements.) For instance, at block 1020, method 1000 may include determining, by computing device 100, a ratio of successful ranging measurements to total ranging measurements for the first ranging measurements, and determining, by computing device 100, a ratio of successful ranging measurements to total ranging measurements for the second ranging measurements, wherein the selected ranging result corresponds to the one of the first ranging measurements and the second ranging measurements with a higher ratio of successful ranging measurements to total ranging measurements.

In some examples, the verification criteria may be based on a deviation of each of the ranging measurements (e.g., first ranging measurements, second ranging measurements) relative to a deviation threshold (e.g., standard deviation) of ranging measurements between one or more pairs of APs of a plurality of APs in a network. For instance, at block 1020, method 1000 may include determining, by computing device 100, a deviation of the first ranging measurements relative to a standard deviation of ranging measurements between the plurality of APs in the network, and determining, by computing device 100, a deviation of the second ranging measurements relative to the standard deviation, wherein the selected ranging result corresponds to the one of the first ranging measurements and the second ranging measurements with a lower deviation.

In some examples, the verification criteria may be based on an RSSI of each of the ranging measurements (e.g., first ranging measurements, second ranging measurements.) For instance, at block 1020, method 1000 may include determining, by computing device 100, an RSSI of the first ranging measurements, and determining, by computing device 100, an RSSI of the second ranging measurements, wherein the selected ranging result corresponds to the one of the first ranging measurements and the second ranging measurements with a stronger RSSI.

In some examples, the verification criteria may correspond to a RTT measurement for each of the ranging measurements (e.g., first ranging measurements, second ranging measurements.) For instance, at block 1020, method 1000 may include selecting, by computing device 100, the ranging result that corresponds to the one of the first ranging measurements and second ranging measurements with a lower (shorter) RTT measurement. The ranging measurements with a lower RTT measurement may have a greater likelihood of indicating a direct line-of-sight (LOS) (i.e., unobstructed path) between the first AP and the second AP, and may thus be more likely to generate more accurate ranging results.

In some examples, the verification criteria may correspond to a CSI measurement for each of the ranging measurements (e.g., first ranging measurements, second ranging measurements.) For instance, at block 1020, method 1000 may include selecting, by computing device 100, the ranging result that corresponds to the one of the first ranging measurements and second ranging measurements with a CSI measurement that indicates a direct LOS between the first AP and the second AP (e.g., rather than an obstructed or reflection path between the first AP and the second AP), and is thus more likely to generate more accurate ranging results.

At block 1025, based on the selected ranging result, method 1000 may include resolving, by computing device 100, locations of the plurality of APs. Block 1025 may include the same or similar steps as described above in relation to block 335 of method 300.

In this manner, example computing device 100 of FIG. 1 (and method 1000 of FIG. 10) may improve the reliability (e.g., accuracy) of ranging results which are used to perform automatic location of APs in a network by validating the ranging results. For instance, when there is a discrepancy between ranging results (first ranging result, second ranging result) from a pair of APs (first AP, second AP), computing device 100 may select one of the ranging results for resolving the locations of the plurality of APs in the network based on a verification criteria (at block 1020) that will identify the ranging result for the pair of APs that is more likely to be inaccurate (e.g., the ranging result that is more likely to correspond to an obstructed line-of-sight between the first AP and the second AP.) That is, computing device 100 may give lesser weight to (e.g., disregard) a ranging result between a pair of APs which would otherwise skew the location estimations of the plurality of APs in the network.

In examples described herein, the term "Wi-Fi" is meant to encompass any type of wireless communications that conforms to any IEEE 802.11 standards, whether 802.11ac, 802.11ax, 802.11a, 802.11n, 802.11ad, 802.11ay, etc. The term "Wi-Fi" is currently promulgated by the Wi-Fi Alliance®. Any products tested and approved as "Wi-Fi Certified" (a registered trademark) by the Wi-Fi Alliance® are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 60 GHz band for 802.11ad or 802.11ay) will work with any other, even if such products are not "Wi-Fi Certified." The term "Wi-Fi" is further intended to encompass future versions and/or variations on the foregoing communication standards. Each of the foregoing standards is hereby incorporated by reference.

In examples described herein, the term "non-transitory media," and similar terms, refers to any electronic, magnetic, optical, or other physical storage device that contains or stores executable instructions. Non-transitory media may comprise non-volatile media and/or volatile media. Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but is not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
  receiving, by a computing device, neighbor adjacency information for a plurality of access points (APs) in a network;
  based on the neighbor adjacency information, assigning, by the computing device, the plurality of APs to non-overlapping zones, wherein a first subset of the plurality of APs is assigned to a first zone of the non-overlapping zones and a second subset of the plurality of APs is assigned to a second zone of the non-overlapping zones;
  initiating, by the computing device, first ranging measurements between the first subset of APs on a first channel to generate a first ranging result;

initiating, by the computing device, second ranging measurements between the second subset of APs on a second channel to generate a second ranging result, wherein the first ranging measurements and the second ranging measurements are performed in parallel;

receiving, by the computing device, the first ranging result and the second ranging result; and based on the first ranging result and the second ranging result, resolving, by the computing device, locations of the plurality of APs.

2. The method of claim 1, comprising:

determining, by the computing device, whether ranging is performed on a third channel for the first subset of APs in the first zone;

based on a determination that ranging is not performed on the third channel for the first subset of APs in the first zone, initiating, by the computing device, third ranging measurements between the first subset of APs on the third channel to generate a third ranging result;

wherein resolving the locations of the plurality of APs is based on the third ranging result.

3. The method of claim 1, wherein receiving the neighbor adjacency information for the plurality of APs in the network comprises:

receiving, by the computing device, a list of APs in the network, wherein the list of APs includes the plurality of APs;

for each AP in the list of APs, receiving, by the computing device, label information for the AP; and based on the label information for each AP in the list of APs, determining, by the computing device, that the plurality of APs are co-planar with each other;

wherein the neighbor adjacency information includes the label information for each AP in the list of APs.

4. The method of claim 1, wherein receiving the neighbor adjacency information for the plurality of APs comprises:

receiving, by the computing device, a list of APs in the network, wherein the list of APs includes the plurality of APS;

receiving, by the computing device, a neighbor adjacency matrix for the APs in the list of APs, wherein the neighbor adjacency matrix is based on a radio frequency (RF) neighborhood discovery performed by the APs; and based on the neighbor adjacency matrix for the APs in the list of APs, determining, by the computing device, that the plurality of APs are in a same RF neighborhood;

wherein the neighbor adjacency information for the plurality of APs includes the neighbor adjacency matrix for the APs in the list of APs.

5. The method of claim 1, wherein assigning the plurality of APs to the non-overlapping zones is based on a received signal strength indicator (RSSI) for the plurality of APs, wherein the neighbor adjacency information includes the RSSI.

6. The method of claim 1, wherein assigning the plurality of APs to the non-overlapping zones comprises:

selecting, by the computing device, a different channel for each of the non-overlapping zones, wherein the first channel is selected for the first zone and the second channel is selected for the second zone.

7. The method of claim 5, wherein initiating the first ranging measurements comprises:

configuring, by the computing device, a bandwidth on the first channel and an antenna chain for each AP of the first subset of APs to use for the first ranging measurements.

8. The method of claim 1, comprising:

determining, by the computing device, whether the first ranging measurements and second ranging measurements are performed for a threshold ratio of links between the plurality of APs;

based on a determination that the first ranging measurements and the second ranging measurements are not performed for the threshold ratio of links, assigning, by the computing device, a third subset of the APs to the first zone, wherein the third subset of APs includes the first subset of APs and at least one other AP of the plurality of APs;

initiating, by the computing device, third ranging measurements between the third subset of APs on the first channel to generate a third ranging result; and receiving, by the computing device, the third ranging result;

wherein resolving the locations of the APs is based on the third ranging result.

9. The method of claim 1, comprising:

determining, by the computing device, whether the first ranging measurements and second ranging measurements are performed for a threshold ratio of links between the plurality of APs;

based on a determination that the first ranging measurements and second ranging measurements are performed for the threshold ratio of links, initiating, by the computing device for each pair of APs of the first subset of APs for which the first ranging measurements are not performed, additional ranging measurements between the pair of APs on the first channel to generate an additional ranging result; and receiving, by the computing device, the additional ranging result;

wherein resolving the locations of the plurality of APs is based on the additional ranging result.

10. The method of claim 1, comprising:

assigning, by the computing device, a third subset of the plurality of APs to a third zone, wherein a distance between the first zone and the third zone is greater than a minimum threshold distance;

initiating, by the computing device, third ranging measurements between the third subset of APs on the first channel to generate a third ranging result, wherein the third ranging measurements are performed in parallel with the first ranging measurements; and receiving, by the computing device, the third ranging result;

wherein resolving the locations of the plurality of APs is based on the third ranging result.

11. The method of claim 1, comprising:

determining, by the computing device, whether the ranging result for a pair of APs of the first subset of APs satisfies an accuracy threshold;

based on a determination that the ranging result satisfies the accuracy threshold, assigning, by the computing device, a first weight to the ranging result for the pair of APs;

based on a determination that the ranging result for the pair of APs does not satisfy the accuracy threshold, assigning, by the computing device, a second weight to the ranging result for the pair of APs, wherein the second weight is less than the first weight; and wherein resolving the locations of the plurality of APs is based on the assigned weight to the ranging result for the pair of APs.

12. The method of claim 1, comprising:
determining, by the computing device, whether a ratio of successful ranging measurements to total ranging measurements for a ranging result for a pair of APs of the first subset of APs satisfies an accuracy threshold;
based on a determination that the ratio satisfies the accuracy threshold, assigning, by the computing device, a first weight to the ranging result for the pair of APs; and
based on a determination that the ratio does not satisfy the accuracy threshold, assigning, by the computing device, a second weight to the ranging result for the pair of APs, wherein the second weight is less than the first weight; and
wherein resolving the locations of the plurality of APs is based on the assigned weight to the ranging result for the pair of APs.

13. The method of claim 1, comprising:
determining, by the computing device, that a difference between a first ranging result for a pair of APs of the first subset of APs and a second ranging result for the pair of APs does not satisfy an accuracy threshold;
based on the determination that the ranging result for the pair of APs does not satisfy the accuracy threshold, selecting, by the computing device, one of the first ranging result for the pair of APs and the second ranging result for the pair of APs based on a verification criteria; and
wherein resolving locations of the plurality of APs is based on the selected one of the ranging results for the pair of APs.

14. The method of claim 13, wherein the verification criteria is based on a ratio of successful ranging measurements to total ranging measurements for the first ranging result for the pair of APs and for the second ranging result for the pair of APs.

15. The method of claim 13, wherein the verification criteria is based on a deviation of each of the first ranging result for the pair of APs and the second ranging result for the pair of APs.

16. The method of claim 13, wherein the verification criteria is based on a received signal strength indicator (RSSI), round trip time (RTT) measurement, or channel state information (CSI) measurement of each of the first ranging result for the pair of APs and the second ranging result for the pair of APs.

17. A computing device, comprising:
a processing resource; and
a non-transitory machine-readable storage medium comprising instructions executable by the processing resource to:
receive neighbor adjacency information for a plurality of access points (APs) in a network;
based on the neighbor adjacency information, assign the plurality of APs to non-overlapping zones, wherein a first subset of the plurality of APs is assigned to a first zone of the non-overlapping zones and a second subset of the plurality of APs is assigned to a second zone of the non-overlapping zones;
initiate first ranging measurements between the first subset of APs on a first channel to generate a first ranging result;
initiate second ranging measurements between the second subset of APs on a second channel to generate a second ranging result, wherein the first ranging measurements and the second ranging measurements are performed in parallel;
receive the first ranging result and the second ranging result; and
based on the first ranging result and the second ranging result, resolve locations of the plurality of APs.

18. The computing device of claim 17, wherein the instructions comprise instructions to:
determine whether the first ranging measurements are performed for a threshold ratio of links between the first subset of APs in the first zone;
based on a determination that the first ranging measurements are performed for the threshold ratio of links, initiate, for each pair of APs of the first subset of APs for which the first ranging measurements has not yet been performed, additional ranging measurements between the pair of APs on the first channel to generate an additional ranging result; and
receive the additional ranging result;
wherein resolving the locations of the plurality of APs is based on the additional ranging result.

19. The computing device of claim 17, wherein the instructions comprise instructions to:
assign a third subset of the plurality of APs to a third zone, wherein a distance between the first zone and the third zone is greater than a minimum threshold distance;
initiate third ranging measurements between the third subset of APs on the first channel to generate a third ranging result, wherein the third ranging measurements are performed in parallel with the first ranging measurements; and
receive the third ranging result;
wherein resolving the locations of the plurality of APs is based on the third ranging result.

20. An article comprising at least one non-transitory machine-readable storage medium comprising instructions executable by at least one processing resource to:
receive, by a computing device, neighbor adjacency information for a plurality of access points (APs) in a network;
based on the neighbor adjacency information, assign, by the computing device, subsets of the plurality of APs to non-overlapping zones;
initiate, by the computing device for each of the non-overlapping zones, ranging measurements between the subset of APs in the zone to generate a ranging result, wherein the ranging measurements between the subsets of APs in the non-overlapping zones are performed in parallel;
receive, by the computing device, the ranging results; and
based on the ranging results, resolve, by the computing device, locations of the plurality of APs.

* * * * *